United States Patent
Namba

(10) Patent No.: US 10,108,225 B2
(45) Date of Patent: Oct. 23, 2018

(54) TERMINAL DEVICE WITH BACK SIDE OPERATION FEATURES

(71) Applicant: Mutsumi Namba, Tokyo (JP)

(72) Inventor: Mutsumi Namba, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1 day.

(21) Appl. No.: 15/260,172

(22) Filed: Sep. 8, 2016

(65) Prior Publication Data

US 2017/0075477 A1  Mar. 16, 2017

(30) Foreign Application Priority Data

Sep. 15, 2015 (JP) .................................. 2015-181528

(51) Int. Cl.
*G06F 1/16* (2006.01)
*G06F 3/0488* (2013.01)
*G06F 3/041* (2006.01)
*G06F 3/0354* (2013.01)

(52) U.S. Cl.
CPC ............ *G06F 1/1626* (2013.01); *G06F 1/169* (2013.01); *G06F 3/03547* (2013.01); *G06F 3/04883* (2013.01)

(58) Field of Classification Search
CPC . G06F 3/03547; G06F 1/1626; G06F 3/04883
See application file for complete search history.

(56) References Cited

U.S. PATENT DOCUMENTS

| | | | |
|---|---|---|---|
| 6,917,991 B2 | 7/2005 | Namba | |
| 8,149,475 B2 | 4/2012 | Namba | |
| 8,180,244 B2 | 5/2012 | Takubo et al. | |
| 8,427,704 B2 | 4/2013 | Tanaka et al. | |
| 2010/0103136 A1* | 4/2010 | Ono | G06F 3/0488 345/173 |
| 2016/0110018 A1* | 4/2016 | Park | G06F 3/0488 345/173 |
| 2017/0024022 A1* | 1/2017 | Upmanue | G06F 3/038 |

FOREIGN PATENT DOCUMENTS

| | | |
|---|---|---|
| JP | 2011-028317 | 2/2011 |
| JP | 2014-222379 | 11/2014 |

* cited by examiner

*Primary Examiner* — Xuemei Zheng
(74) *Attorney, Agent, or Firm* — Duft & Bornsen, PC

(57) ABSTRACT

A terminal device includes a screen where information is displayed, an operation range configured to fully or partially cover an operation portion disposed on a back side of the screen, an operation being input from a user to the operation range, and a processor configured to convert a signal obtained from the operation input to the operation range, into a signal indicating coordinate information in an operational range of the screen, wherein the operation range is smaller in size than the operational range of the screen.

9 Claims, 23 Drawing Sheets

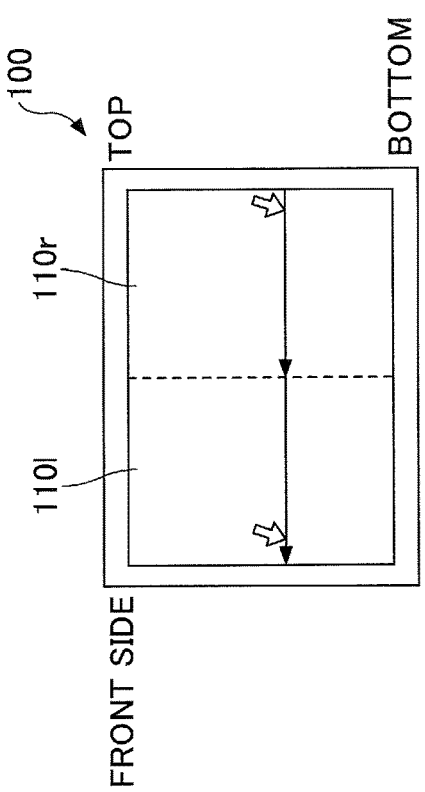
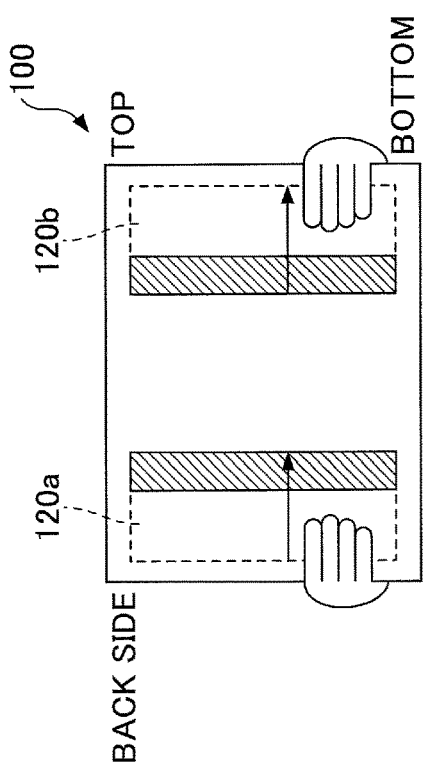

FIG.8

| OPERATION TYPES | DETERMINATION ELEMENTS | | |
| --- | --- | --- | --- |
| | TOUCH TIME | TOUCH POSITION SHIFT | SHIFT SPEED |
| TAP | LESS THAN PREDETERMINED TIME | NO | — |
| LONG PRESS | GREATER THAN PREDETERMINED TIME | NO | — |
| SLIDE | — | YES | LESS THAN PREDETERMINED SPEED |
| FLICK | — | YES | GREATER THAN PREDETERMINED SPEED |

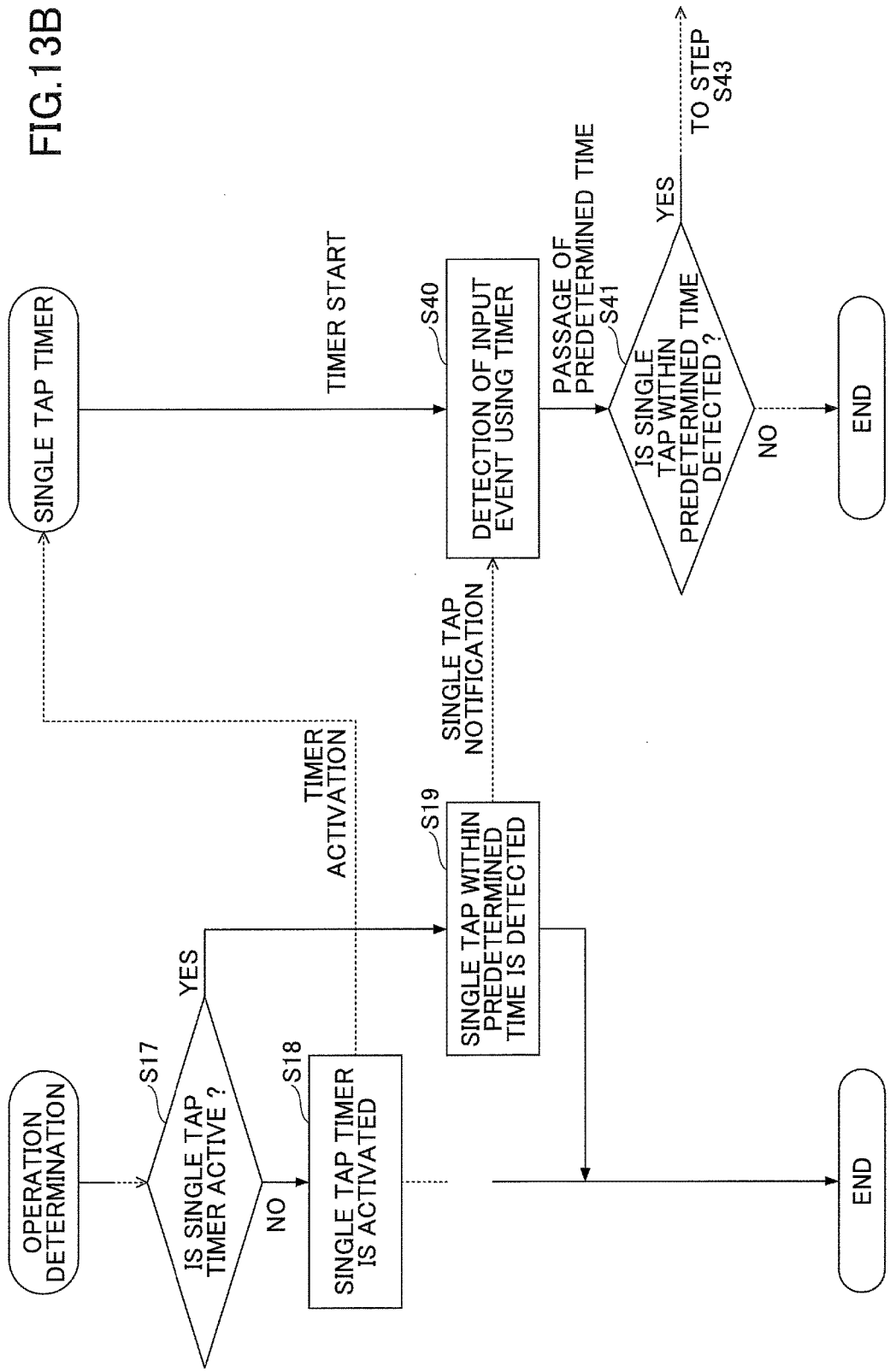

FIG.15

| OPERATION NAME | OPERATION |
|---|---|
| SINGLE TAP | TAP OPERATING FINGER ON OPERATION PANEL ONCE |
| DOUBLE TAP | TAP OPERATING FINGER ON OPERATION PANEL TWICE WITHIN PREDETERMINED TIME |
| TWO-FINGER TAP | TAP TWO ADJACENT OPERATING FINGERS ON OPERATION PANEL |
| LONG PRESS | HOLD OPERATING FINGER IN CONTACT WITH OPERATION PANEL OVER PREDETERMINED TIME |
| PRESS AND TAP | DO LONG PRESS ON OPERATION PANEL BY OPERATING FINGER AND DO SINGLE TAP THEREON BY ADJACENT OPERATING FINGER |
| FLICK | CAUSE OPERATING FINGER TO SLIDE ON OPERATION PANEL QUICKLY |
| DRAG | CAUSE OPERATING FINGER TO SLIDE ON OPERATION PANEL |
| PINCH IN | PINCH OBJECT BETWEEN TWO OPERATING FINGERS AND REDUCE SPACE BETWEEN THE FINGERS |
| PINCH OUT | PINCH OBJECT BETWEEN TWO OPERATING FINGERS AND ENLARGE SPACE BETWEEN THE FINGERS |
| ROTATION | CAUSE OPERATING FINGER TO SLIDE ON FRONT-SIDE SCREEN UP/DOWN WHILE TOUCHING OBJECT ON BACK-SIDE OPERATION PANEL BY OPERATING FINGER. IN CASE OF RIGHT OPERATING FINGER, UP SLIDE CAUSES LEFT-HANDED ROTATION AND DOWN SLIDE CAUSES RIGHT-HANDED ROTATION. IN CASE OF LEFT OPERATING FINGER, UP SLIDE CAUSES RIGHT-HANDED ROTATION AND DOWN SLIDE CAUSES LEFT-HANDED ROTATION. |

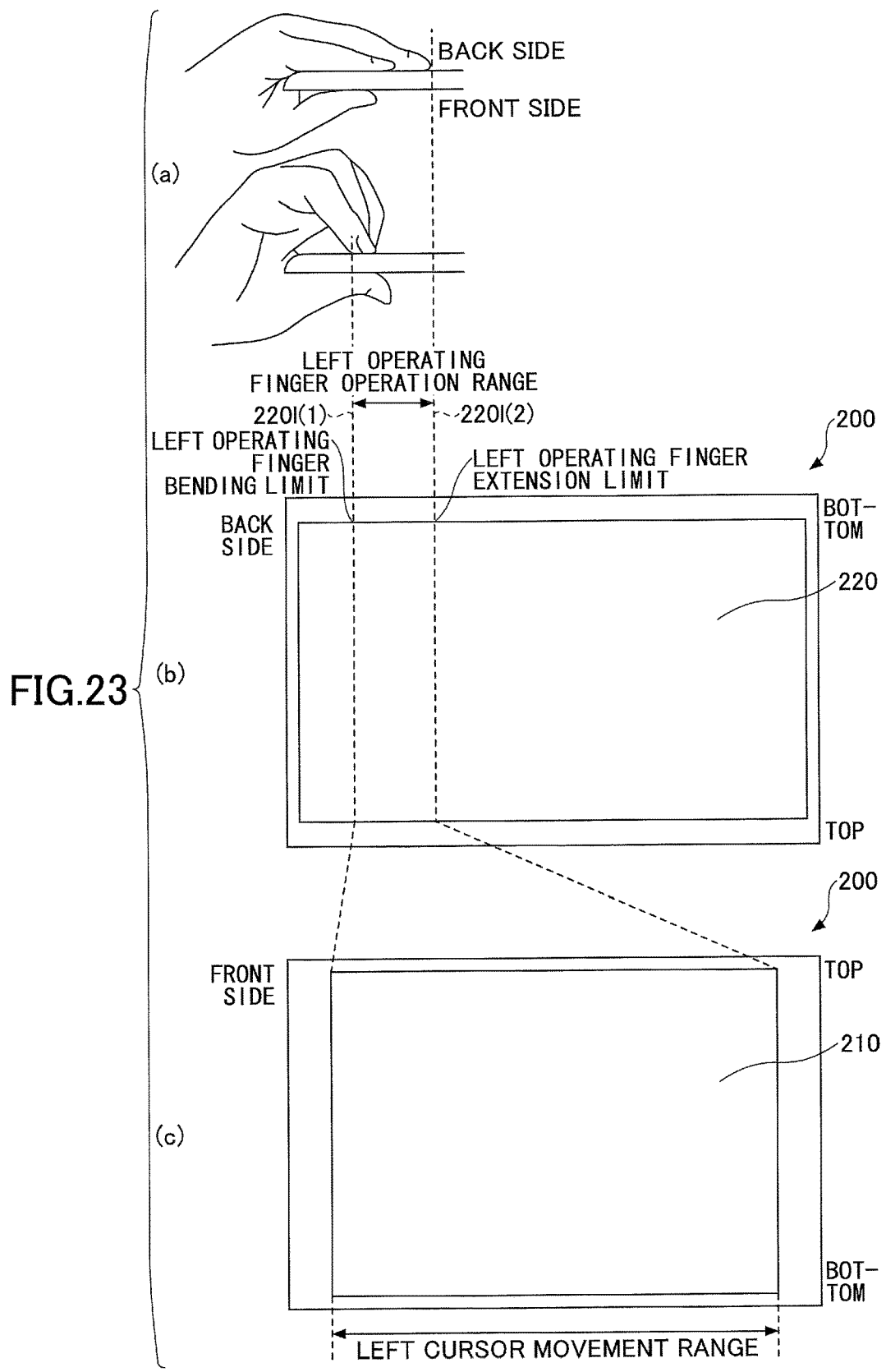

TERMINAL DEVICE WITH BACK SIDE OPERATION FEATURES

CROSS-REFERENCE TO RELATED APPLICATIONS

The present application is based upon and claims the benefit of priority of Japanese Patent Application No. 2015-181528, filed on Sep. 15, 2015, the contents of which are incorporated herein by reference in their entirety.

BACKGROUND OF THE INVENTION

1. Field of the Invention

The present disclosure relates to a terminal device, a method, and a recording medium.

2. Description of the Related Art

There is known a terminal device including a front-side touch panel and a back-side touch panel to provide increased operability. A user is able to do a screen operation on the front-side touch panel by operating the back-side touch panel while gripping the terminal device.

For example, a first touch sensor is mounted on the front side of the terminal device and a second touch sensor is mounted on the back side of the terminal device, so that operability of the terminal device is increased with a combination of a touch operation to the first touch sensor on the front side and a touch operation to the second touch sensor on the back side. For example, see Japanese Unexamined Patent Application Publication No. 2014-222379.

SUMMARY OF THE INVENTION

According to an aspect of the present disclosure, a terminal device is capable of providing increased screen operability.

In one embodiment, the present disclosure provides a terminal device including a screen where information is displayed, an operation range configured to fully or partially cover an operation portion disposed on a back side of the screen, an operation being input from a user to the operation range, and a processor configured to convert a signal obtained from the operation input to the operation range, into a signal indicating coordinate information in an operational range of the screen, wherein the operation range is smaller in size than the operational range of the screen.

The object and advantages of the invention will be implemented and attained by means of the elements and combinations particularly pointed out in the claims. It is to be understood that both the foregoing general description and the following detailed description are exemplary and explanatory and are not restrictive of the invention as claimed.

BRIEF DESCRIPTION OF THE DRAWINGS

FIGS. 7A and 7B are diagrams illustrating an example of a process in which a conversion magnification is utilized.

FIG. 8 is a diagram illustrating a relation table of operation types and determination elements.

FIG. 13B is a flowchart for explaining a relationship between the operation determination process and the event determination process using the single tap timer.

FIG. 15 is a diagram illustrating examples of operations input to an operation panel.

FIG. 23 is a diagram illustrating a positional relationship of a screen and an operation panel of a terminal device according to a third embodiment.

DETAILED DESCRIPTION OF THE PREFERRED EMBODIMENTS

A description will be given of embodiments with reference to the accompanying drawings.

[First Embodiment]

Figure 1:
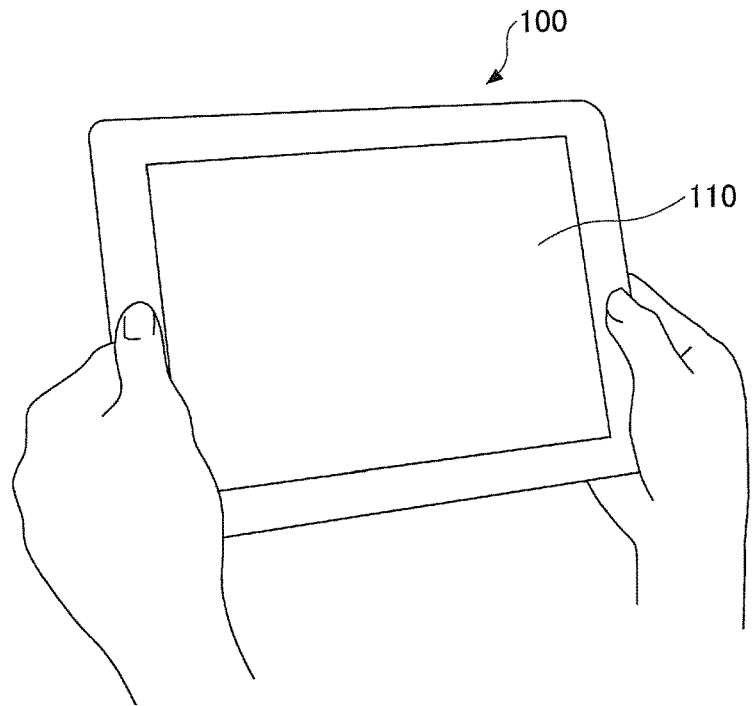
FIG. 1 is a diagram illustrating the appearance of a front side of a terminal device according to a first embodiment.

FIG. 1 illustrates the appearance of a front side of a terminal device 100 according to a first embodiment. As illustrated in FIG. 1, the terminal device 100 includes a screen 110 on the front side of the terminal device. The screen 110 includes a display layer which displays information such as an image to a user, and an operation layer which receives an operation input from the user to the screen 110. For example, when no operation is input to the screen 110, the user grips the terminal device 100 by placing the thumbs of the user's right and left hands on the screen 110 and causing other four fingers of each of the two hands to contact the back side of the screen 110. Note that the operation layer may not be included in the screen 110.

Figure 2:
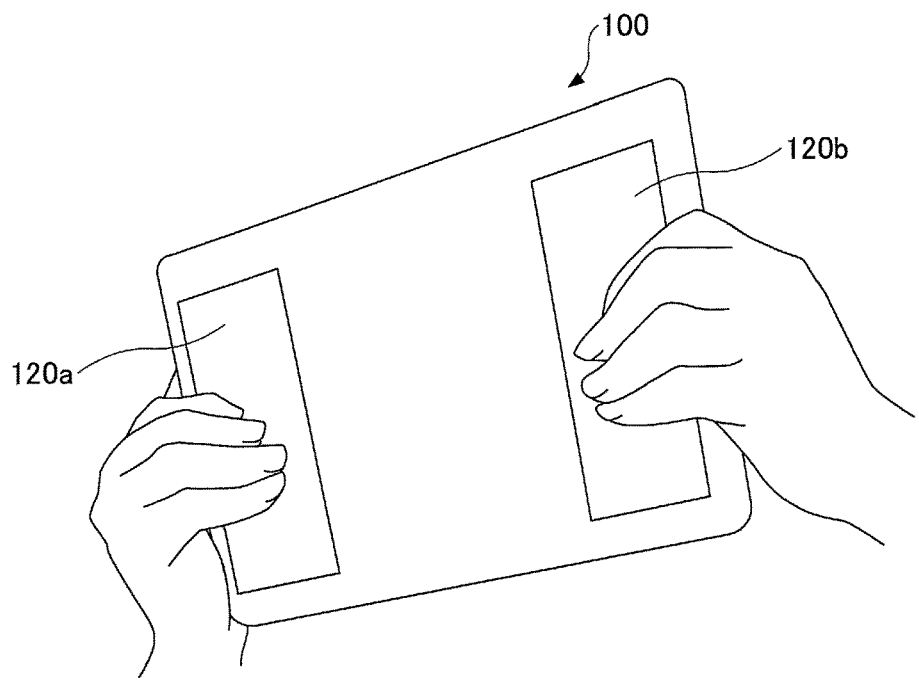
FIG. 2 is a diagram illustrating the appearance of a back side of the terminal device according to the first embodiment.

FIG. 2 illustrates the appearance of a back side of the terminal device 100. As illustrated in FIG. 2, the terminal device 100 includes a right operation panel 120a and a left operation panel 120b which are disposed at a right-hand part and at a left-hand part of the back side of the terminal device 100, respectively, when viewed from the user gripping the terminal device 100. For example, the right operation panel 120a is provided so that four fingers of the user's right hand come in contact with the right operation panel 120a when the user grips the terminal device 100. Similarly, the left operation panel 120b is provided so that four fingers of the user's left hand come in contact with the left operation panel 120b when the user grips the terminal device 100. In the following, in some cases, the right operation panel 120a and the left operation panel 120b are collectively referred to as an operation panel 120.

Moreover, a range of the right operation panel 120a and a range of the left operation panel 120b may be set up based on an operational range (an operating finger operation range) which is determined according to a size of hands of the average user.

Note that the installation positions of the right operation panel 120a and the left operation panel 120b illustrated in FIG. 2 are exemplary and explanatory and not limited to the example of FIG. 2.

Figure 3:
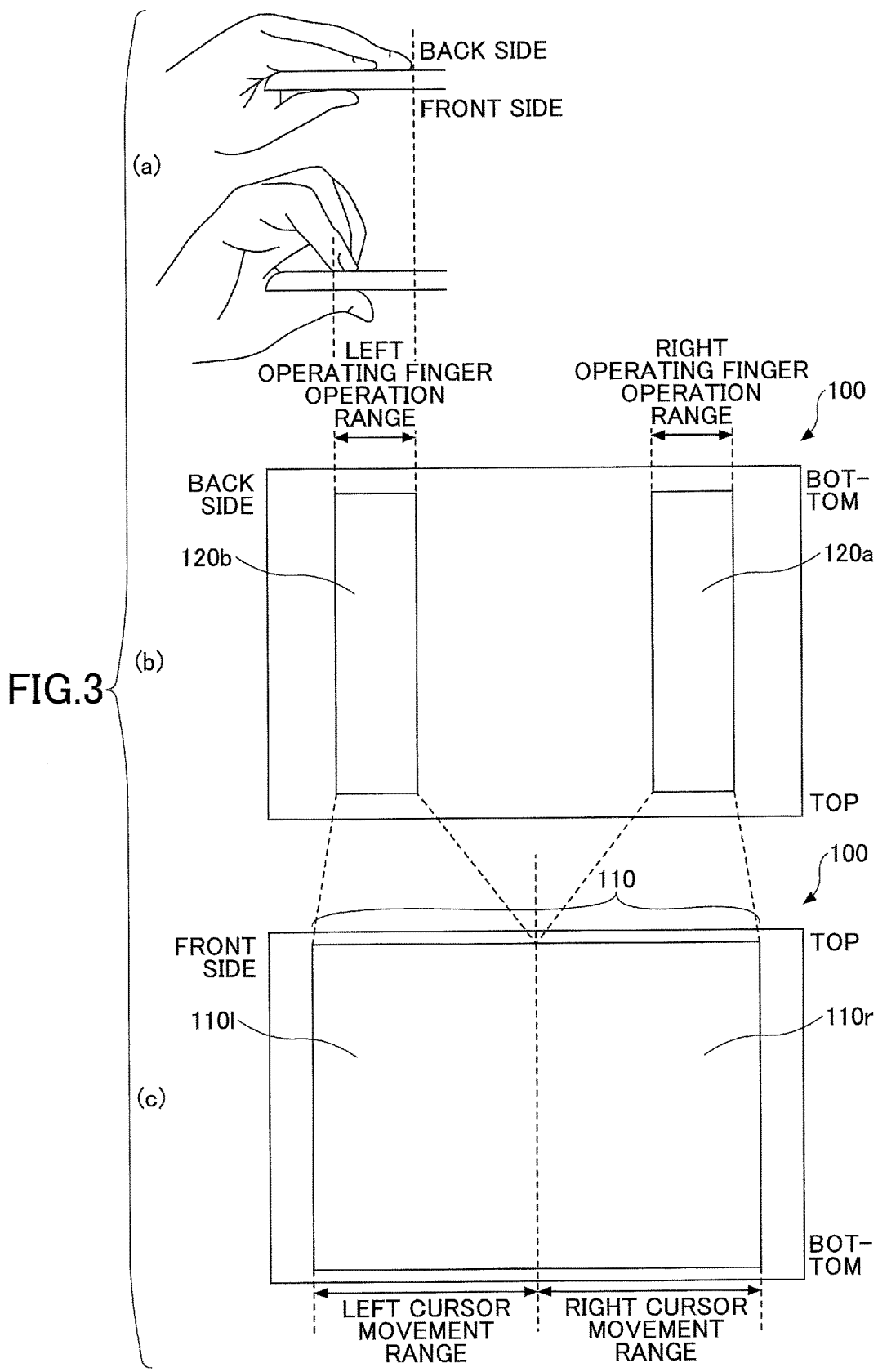
FIG. 3 is a diagram illustrating a positional relationship of a screen, a right operation panel, and a left operation panel of the terminal device.

FIG. 3 illustrates a positional relationship of the screen 110, the right operation panel 120a, and the left operation panel 120b of the terminal device 100. An example of a left operating finger operation range is illustrated in FIG. 3 (a). Each of upper and lower parts of FIG. 3 (a) is a side view of the terminal device 100. An upper part of FIG. 3 (a) is equivalent to the back side of the terminal device 100, and a lower part of FIG. 3 (a) is equivalent to the front side of the terminal device 100. FIG. 3 (b) is a bottom view (the back side) of the terminal device 100, and FIG. 3 (c) is a top view (the front side) of the terminal device 100. Note that the illustration of FIG. 3 (b) (the back side view of the terminal device 100) is inverted, when viewed from a user, relative to the illustration of FIG. 3 (c) (the front side view of the terminal device 100). Namely, the top and bottom of the illustration of FIG. 3 (c) are consistent with the top and bottom of the terminal device 100, while the top and bottom of the illustration of FIG. 3 (b) are consistent with the bottom and top of the terminal device 100. This also holds true for FIG. 20 and FIG. 23 which will be described later.

In the upper part of FIG. 3 (a), the user extends his left-hand operating finger to the utmost limit while gripping the terminal device 100. In the lower part of FIG. 3 (a), the user bends the finger to the nearest limit while gripping the terminal device 100. In the following, a range from a position of the operation panel 120 contacted by the finger illustrated in the upper part of FIG. 3 (a) to a position of the operation panel 120 contacted by the finger illustrated in the lower part of FIG. 3 (a) is called a left operating finger operation range. Similarly, a right operating finger operation range which is symmetrical with the left operating finger operation range may be defined as illustrated in FIG. 3(b). Note that a description of the right operating finger operation range is omitted.

The right operation panel 120a and the left operation panel 120b are illustrated in FIG. 3 (b). The right operation panel 120a is disposed in a range corresponding to the right operating finger operation range, and the left operation panel 120b is disposed in a range corresponding to the left operating finger operation range.

For example, each of the right operation panel 120a and the left operation panel 120b is formed into a smooth surface. On the other hand, a portion of the back side of the terminal device 100 other than the right operation panel 120a and the left operation-panel 120b is formed into an uneven surface. Hence, even if the user does not visually check the right operation panel 120a and the left operation panel 120b, the user is able to grasp the positions of the right operation panel 120a and the left operation panel 120b with a tactile sense of the fingers.

The screen 110 is illustrated in FIG. 3 (c). The screen 110 is divided into a right screen 110r as a right-side half of the screen 110 and a left screen 110l as a left-side half of the screen 110. A portion of the screen 110 which is operational for the user with the right operation panel 120a corresponds to the screen 110r, and a portion of the screen 110 which is operational for the user with the left operation panel 120b corresponds to the screen 110l.

When the user grips the terminal device 100 with both the hands, a width of the screen 110r in a direction parallel to a lateral direction (the gripping direction) of the terminal device 100 is called a right cursor movement range, and a width of the screen 110l in the direction parallel to the gripping direction is called a left cursor movement range. For example, when the user traces the left operation panel 120b with his finger from an outer boundary to an inner boundary of the left operating finger operation range, a cursor on the screen 110 of the terminal device 100 is moved from the left end to the right end of the left cursor movement range (i.e., from the left end to the middle of the screen 110). A control of the movement of the cursor when the right operation panel 120a and the left operation panel 120b are operated by the user will be described later.

Figure 4:
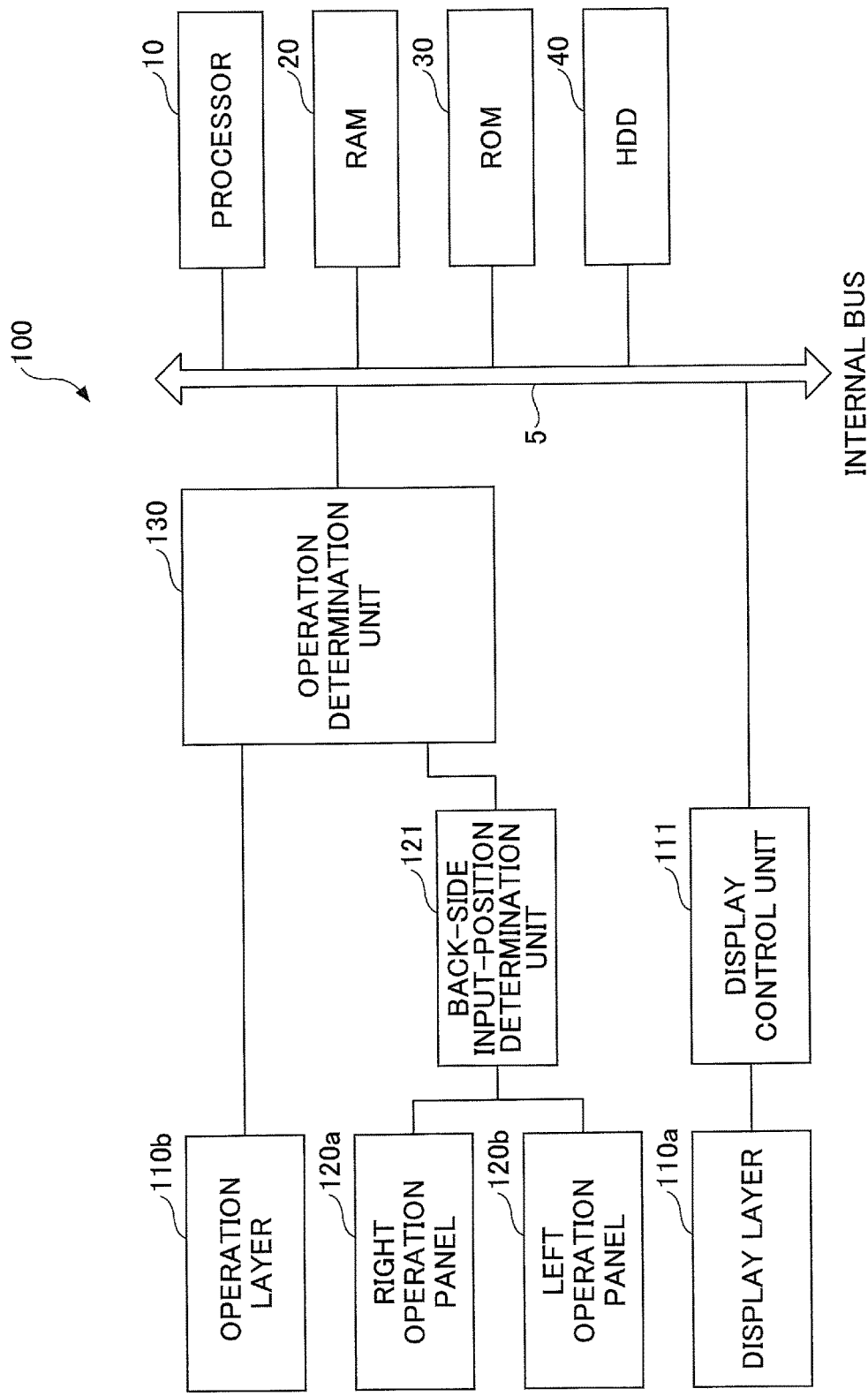
FIG. 4 is a block diagram illustrating a configuration of internal components of the terminal device according to the first embodiment.

FIG. 4 illustrates a configuration of internal components of the terminal device 100 according to the first embodiment. As illustrated in FIG. 4, the terminal device 100 includes a processor 10, a random access memory (RAM) 20, a read-only memory (ROM) 30, a hard disk drive (HDD) 40, a display layer 110a, an operation layer 110b, a display control unit 111, the right operation panel 120a, the left operation panel 120b, a back-side input position determination unit 121, and an operation determination unit 130. The processor 10, the RAM 20, the ROM 30, the HDD 40, the display control unit 111, and the operation determination unit 130 are interconnected by an internal bus 5.

The ROM 30 or the HDD 40 stores programs for controlling the terminal device 100. The display control unit 111, the back-side input position determination unit 121, and the operation determination unit 130 represent functions and units implemented by any of the components and devices of the terminal device 100 illustrated in FIG. 4, which are activated by instructions from the processor 10 based on the programs stored in the ROM 30 or the HDD 40.

The operation layer 110b is connected to the operation determination unit 130. For example, the operation layer 110b is configured to detect an operation input from the user's finger to the screen 110, convert the operation information into a signal indicating the operation information, and transmit the signal to the operation determination unit 130. For example, the operation layer 110b is configured to detect an operation (for example, a tap operation) input to the screen 110 in a direction perpendicular to the surface of the screen 110. Note that the operation layer 110b may be configured to detect an operation (for example, a slide operation) input to the screen 110 in a direction parallel to the surface of the screen 110. The operation determination unit 130 is configured to identify the operation input to the screen 110 in the direction perpendicular to the surface of the screen 110, such as a single tap operation or a double tap operation, based on the signal received from the operation layer 110b.

The right operation panel 120a is connected to the back-side input position determination unit 121. The right operation panel 120a is configured to detect an operation input from a user's right-hand finger to the right operation panel 120a, convert the operation information into a signal, and transmit the signal to the back-side input position determination unit 121. For example, the right operation panel 120a is configured to detect an operation (for example, a drag operation) input to the right operation panel 120a in the direction parallel to the surface of the screen 110.

Similar to the right operation panel 120a, the left operation panel 120b is connected to the back-side input position determination unit 121. The left operation panel 120b is configured to detect an operation input to the left operation panel 120b in the direction parallel to the surface of the screen 110, and transmit a signal indicating the operation information to the back-side input position determination unit 121.

The back-side input position determination unit 121 is configured to send to the operation determination unit 130 a notification of information indicating coordinates of a position where a right-hand finger contacts the right operation panel 120a, coordinates of a position where the right-hand finger leaves the right operation panel 120a, and a shift speed of the right-hand finger. Further, the back-side input position determination unit 121 is configured to send to the operation determination unit 130 a notification of information indicating coordinates of a position where a left-hand finger contacts the left operation panel 120b, coordinates of a position where the left-hand finger leaves the left operation panel 120b, and a shift speed of the left-hand finger.

The operation determination unit 130 is configured to identify the operation input from the user's right-hand finger, such as a slide operation, a flick operation or a drag operation, based on the coordinates of the position where the right-hand finger contacts the right operation panel 120a, the coordinates of the position where the right-hand finger leaves the right operation panel 120a, and the shift speed of the right-hand finger. Further, the operation determination unit 130 is configured to identify the operation input from the user's left-hand finger, such as a slide operation, a flick operation or a drag operation, based on the coordinates of the position where the left-hand finger contacts the left operation panel 120b, the coordinates of the position where the left-hand finger leaves the left operation panel 120b, and the shift speed of the left-hand finger.

The display layer 110a is connected to the display control unit 111. For example, when displaying of image information stored in the HDD 40 is instructed from the processor 10, the display control unit 111 causes the display layer 110a to display the image information.

The processor 10 is configured to control overall operations of the terminal device 100. The processor 10 executes the programs, such as an operating system, applications, and services, stored in the HDD 40 or the ROM 30, and implements various functions of the terminal device 100, such as the functions of the back-side input position determination unit 121, the operation determination unit 130, and the display control unit 111. The ROM 30 stores various programs and data utilized by the programs. The RAM 20 provides a storage area for loading a program and is utilized as a work area of the processor 10. The HDD 40 stores various data and programs.

Figure 5:
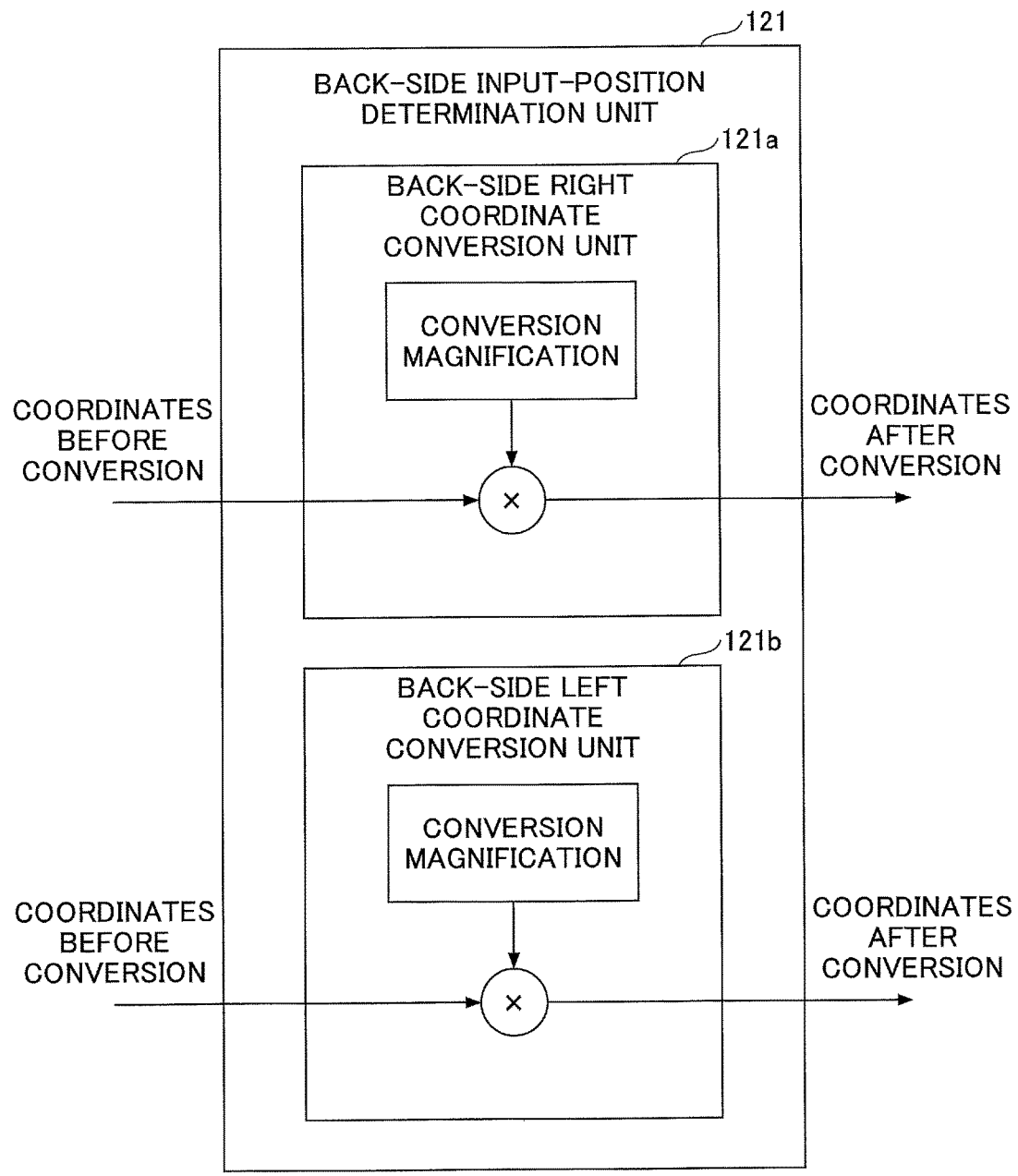
FIG. 5 is a diagram illustrating a configuration of internal components of a back-side input position determination unit.

FIG. 5 illustrates a configuration of internal components of the back-side input position determination unit 121. As illustrated in FIG. 5, the back-side input position determination unit 121 includes a back-side right coordinate conversion unit 121a and a back-side left coordinate conversion unit 121b.

The back-side right coordinate conversion unit 121a is configured to obtain coordinates (coordinates of a start point) of a position where the right-hand finger contacts the right operation panel 120a, and obtain coordinates (coordinates of an end point) of a position where the right-hand finger leaves the right operation panel 120a.

The back-side right coordinate conversion unit 121a is configured to compute a conversion magnification "n" by the following formula (I):

conversion magnification "$n$"(right)=(right operating finger movement range)/(right cursor movement range).

When the finger position moves from the coordinates of a point on the right operation panel 120a, the back-side right coordinate conversion unit 121a is configured to multiply each of a movement distance of X coordinate of the point on the right operation panel 120a and a movement distance of Y coordinate of the point on the right operation panel 120a by the conversion magnification to compute coordinates of a position of the cursor on the screen 110r after the movement.

The back-side left coordinate conversion unit 121b is configured to compute a conversion magnification (left) and the coordinates of a position of the cursor on the screen 110l after the movement in the same manner as the back-side right coordinate conversion unit 121a.

Figure 6:
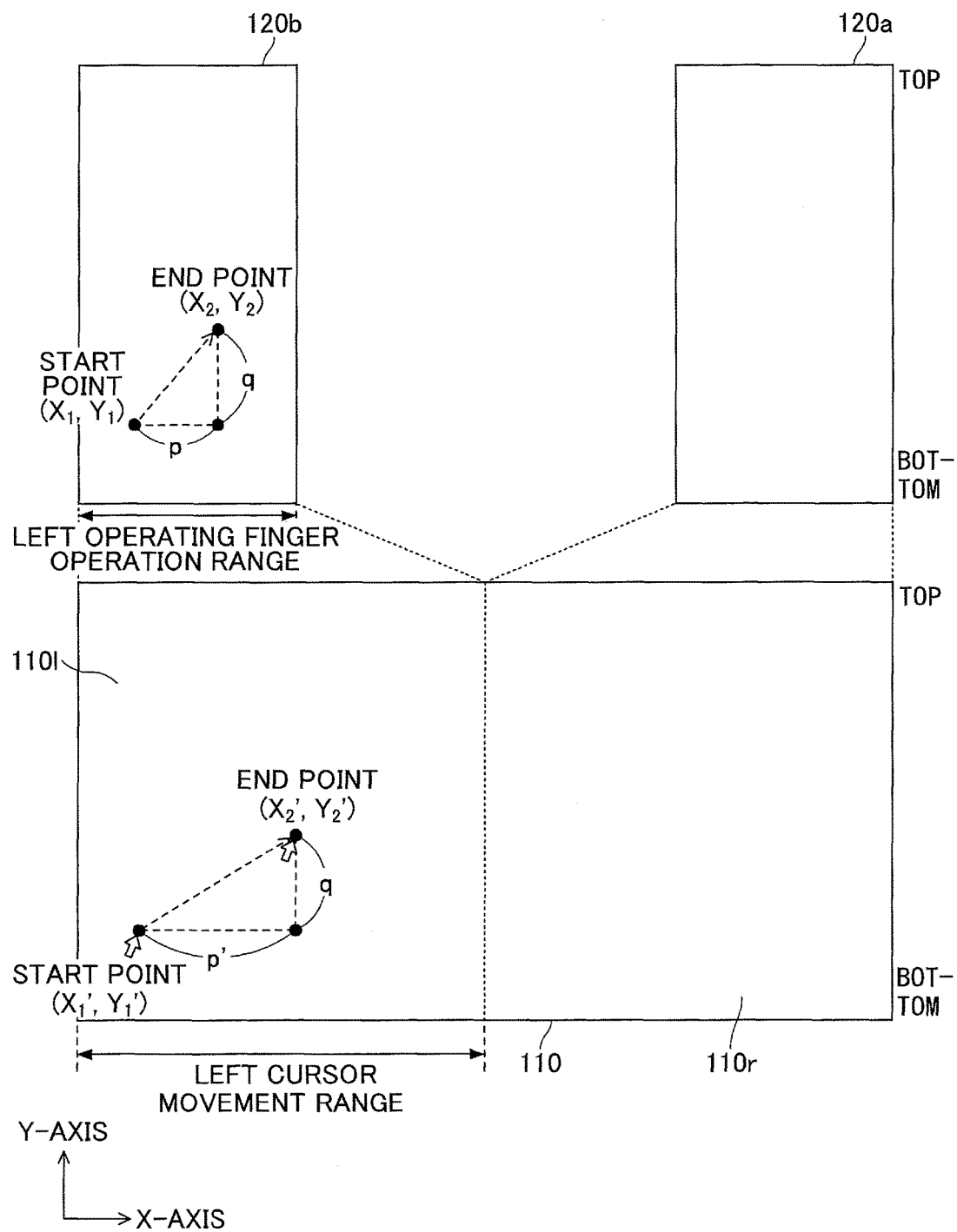
FIG. 6 is a diagram illustrating an example of a process in which a conversion magnification is utilized.

FIG. 6 illustrates an example of a process in which a conversion magnification is utilized. The right operation panel 120a and the left operation panel 120b on the back side of the terminal device 100 are illustrated in an upper part of FIG. 6, and the screen 110r and the screen 110l on the front side of the terminal device 100 are illustrated in a lower part of FIG. 6. The top and bottom of the upper illustration of FIG. 6 are consistent with the top and bottom of the terminal device 100 when viewed from the user, and the top and bottom of the lower illustration of FIG. 6 are consistent with the top and bottom of the terminal device 100 when viewed from the user.

As illustrated in FIG. 6, a case where a left-hand finger is moved from coordinates (X1, Y1) of a start point on the left operation panel 120b to coordinates (X2, Y2) of an end point thereon will be described. In this case, the back-side left coordinate conversion unit 121b obtains a movement distance (p=X2−X1) of X coordinates and a movement distance (q=Y2−Y1) of Y coordinates. A width of the left operation panel 120b in an X-axis direction differs from a width of the screen 110l in the X-axis direction ((left operating finger operation range)/(left cursor movement range)<1). A height of the left operation panel 120b in a Y-axis direction is equal to a height of the screen 110l in the Y-axis direction. The back-side left coordinate conversion unit 121b multiplies the movement distance p of X coordinates on the left operation panel 120b by the conversion magnification n to compute a movement distance p' in the X-axis direction on the screen 110l. The back-side left coordinate conversion unit 121b moves the cursor on the screen 110l in the X-axis direction by the movement distance p' (=p×n). Because the conversion magnification in the Y-axis direction is equal to 1, the back-side left coordinate conversion unit 121b moves the cursor to an end point (X2', Y2') on the screen 110l in the Y-axis direction by a distance equal to the movement distance q of Y coordinates on the left operation panel 120b.

When the right operation panel 120a is operated by the user, the back-side right coordinate conversion unit 121a moves the cursor on the screen 110r in the same manner as in the above-described case of the left operation panel 120b illustrated in FIG. 6.

Moreover, in the example of FIG. 6, the height of the left operation panel 120b is equal to the height of the screen 110l in the Y-axis direction. However, the terminal device 100 according to the first embodiment is not limited to this example. When the height of the left operation panel 120b in the Y-axis direction differs from the height of the screen 110l, the back-side right coordinate conversion unit 121b (and the back-side right coordinate conversion unit 121a) may be configured to compute the conversion magnification in the Y-axis direction in the same manner as in the above case of the X-axis direction.

FIGS. 7A and 7B illustrate an example of a process in which a conversion magnification is utilized. In the example of FIGS. 7A and 7B, an operation by which the cursor is moved from the right end of the screen 110r to the left end of the screen 110l will be described. FIG. 7A illustrates the back side of the terminal device 100 and FIG. 7B illustrates the front side of the terminal device 100. In FIG. 7A, the shaded portions of the right operation panel 120a and the left operation panel 120b denote operating finger switching ranges. For example, when the user performs a cursor operation on the right operation panel 120a, if the user brings the left-hand finger in contact with the operating finger switching range of the left operation panel 120b while the right-hand finger contacts the operating finger switching range of the right operation panel 120a, the cursor operation is switched to a cursor operation based on the left operation panel 120b.

Note that the right end of the right operation panel 120a on the back side of the terminal device 100 when viewed from the user is consistent with the left end of the right operation panel 120a illustrated in FIG. 7A, and the right and left of the illustration of FIG. 7A are the reverse of the right and left of the back side of the terminal device 100.

First, as illustrated in FIG. 7A, the user places the right-hand finger in contact with the right end of the right operation panel 120a and slides the right-hand finger to the left end of the right operation panel 120a. As illustrated in FIG. 7B, the cursor is then moved from the right end to the left end of the screen 110r (to the middle of the screen 110). Next, the user places the left-hand finger in contact with to the operating finger switching range of the left operation panel 120b while placing the right-hand finger in contact with the operating finger switching range of the right operation panel 120a. If the user slides the left-hand finger to the left end of the left operation panel 120b, then the cursor is moved from the right end of the screen 110l (from the middle of the screen 110) to the left end of the screen 110l as illustrated in FIG. 7B. In this manner, the cursor operation may be taken over from the right-hand finger to the left-hand finger or vice versa when the user places the right-hand and left-hand fingers in contact with the operating finger switching ranges of the right and left operation panels 120a and 120b, respectively, at the same time.

FIG. 8 illustrates a relation table of operation types and determination elements. In the relation table of FIG. 8, it is assumed that the user operates the terminal device 100 using the right operation panel 120a and the left operation panel 120b. The operation types arrayed in rows of the relation table of FIG. 8 include tap, long press, slide, and flick. The determination elements arrayed in columns of the relation table of FIG. 8 include touch time, touch position shift, and shift speed. Note that the operation types included in the relation table are exemplary and explanatory and the relation table may also include other operation types.

For example, the operation determination unit 130 determines that a tap operation is performed, when a touch time that the user's finger touches the right operation panel 120a or the left operation panel 120b is less than a predetermined time and the finger does not move after the touch. On the other hand, when the touch time that the user's finger touches the right operation panel 120a or the left operation panel 120b is greater than the predetermined time and the finger does not move after the touch, the operation determination unit 130 determines that a long press operation is performed.

Further, when the user's finger touches the right operation panel 120a or the left operation panel 120b and the finger moves after the touch at a speed less than a predetermined speed, the operation determination unit 130 determines that a slide operation is performed. On the other hand, when the user's finger touches the right operation panel 120a or the left operation panel 120b and the finger moves after the touch at a speed greater than the predetermined speed, the operation determination unit 130 determines that a flick operation is performed.

Figure 9A:
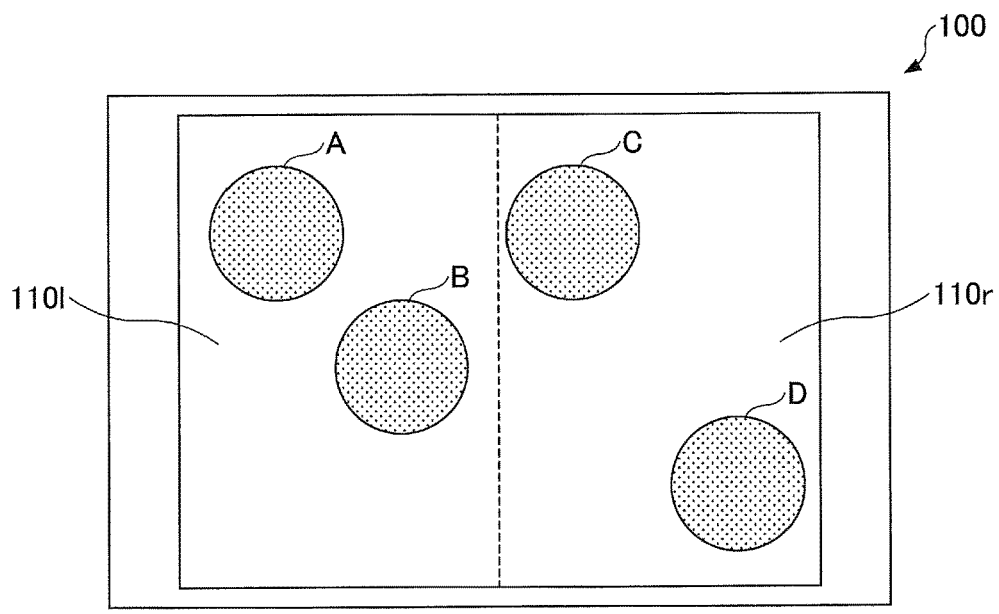
FIG. 9A is a diagram for explaining a screen operation.

FIG. 9A is a diagram for explaining a screen operation on the screen 110. As illustrated in FIG. 9A, on the screen 110 (which is divided into the screen 110r and the screen 110l), four objects, including an object A, an object B, an object C, and an object D, are displayed. The object A, the object B, the object C, and the object D are provided to be operational with a drag operation or a click operation. The screen 110 includes the display layer 110a where image information is displayed, and the operation layer 110b that detects the contact of a finger or the like. The operation layer 110b is configured to detect an operation (e.g., a click operation) input to the screen 110 in a direction perpendicular to the object displayed on the screen 110. For example, a click operation on a button displayed on the screen 110 is detected by the operation layer 110b of the screen 110.

Figure 9B:
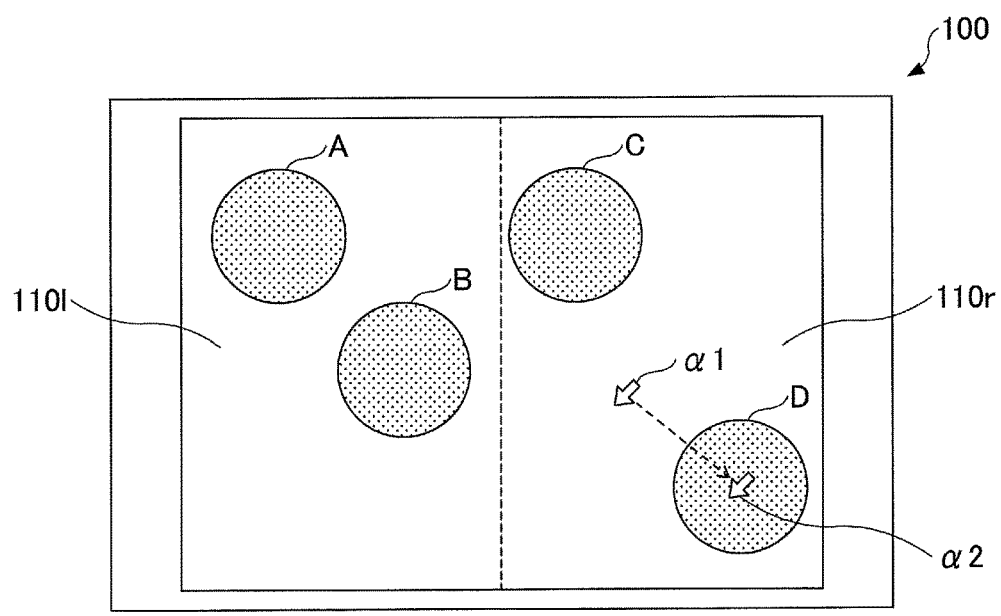
FIG. 9B is a diagram for explaining a screen operation.

FIG. 9B is a diagram for explaining a screen operation on the screen 110. For example, when a user's right-hand finger contacts a predetermined portion of the right operation panel 120a, the operation determination unit 130 causes the display layer 110a to display a cursor $\alpha 1$. If the user moves the right-hand finger in the right obliquely downward direction, the operation determination unit 130 causes the display layer 110a to move the cursor $\alpha 1$ to a position of a cursor $\alpha 2$. Subsequently, if the user places the right-hand finger or the left-hand finger in contact with an arbitrary position on the screen 110 and then slides the finger in the upward or downward direction, the operation determination unit 130 determines that a click operation to the object D is performed.

As illustrated in FIG. 9A and FIG. 9B, the operation determination unit 130 is configured to detect an operation, such as a click operation to an object, input to the screen 110 in a direction perpendicular to the screen 110, and configured to detect an operation, such as a slide operation, on the right operation panel 120a and the left operation panel 120b.

Figure 10:
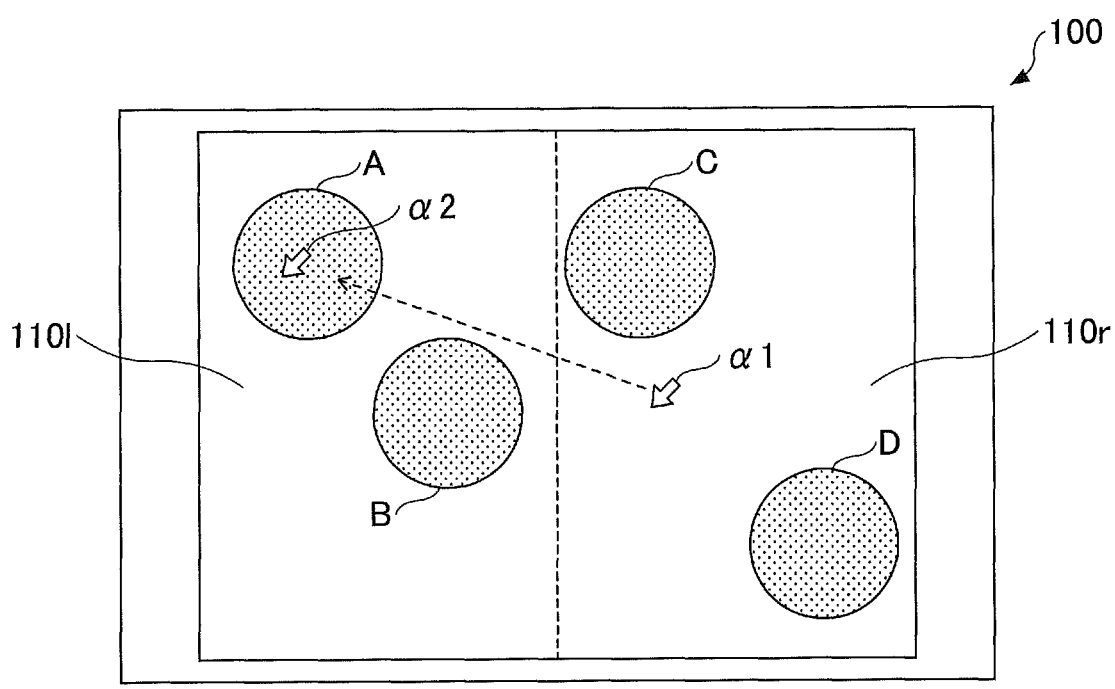
FIG. 10 is a diagram for explaining a screen operation.

FIG. 10 is a diagram for explaining a screen operation on the screen 110. When a user's right-hand finger contacts the predetermined portion of the right operation panel 120a, the operation determination unit 130 causes the display layer 110a to display a cursor $\alpha 1$. If the user moves the right-hand finger to the operating finger switching range while placing the right-hand finger in contact with the right operation panel 120a, the operation determination unit 130 causes the display layer 110*a* to move the cursor α1 to a position near the middle of the screen 110. Subsequently, if the user places the left-hand finger in contact with the operating finger switching range while placing the right-hand finger in contact with the operating finger switching range, the operation determination unit 130 changes the operating finger to the left-hand finger. Subsequently, if the user moves the left-hand finger in the left obliquely upward direction, the operation determination unit 130 causes the display layer 110*a* to move the cursor α1 to a position of a cursor α2. Subsequently, if the user places the right-hand finger or the left-hand finger in contact with an arbitrary position on the screen 110 and then slides the finger in the upward or downward direction, the operation determination unit 130 determines that a click operation to the object A is performed.

Figure 11:
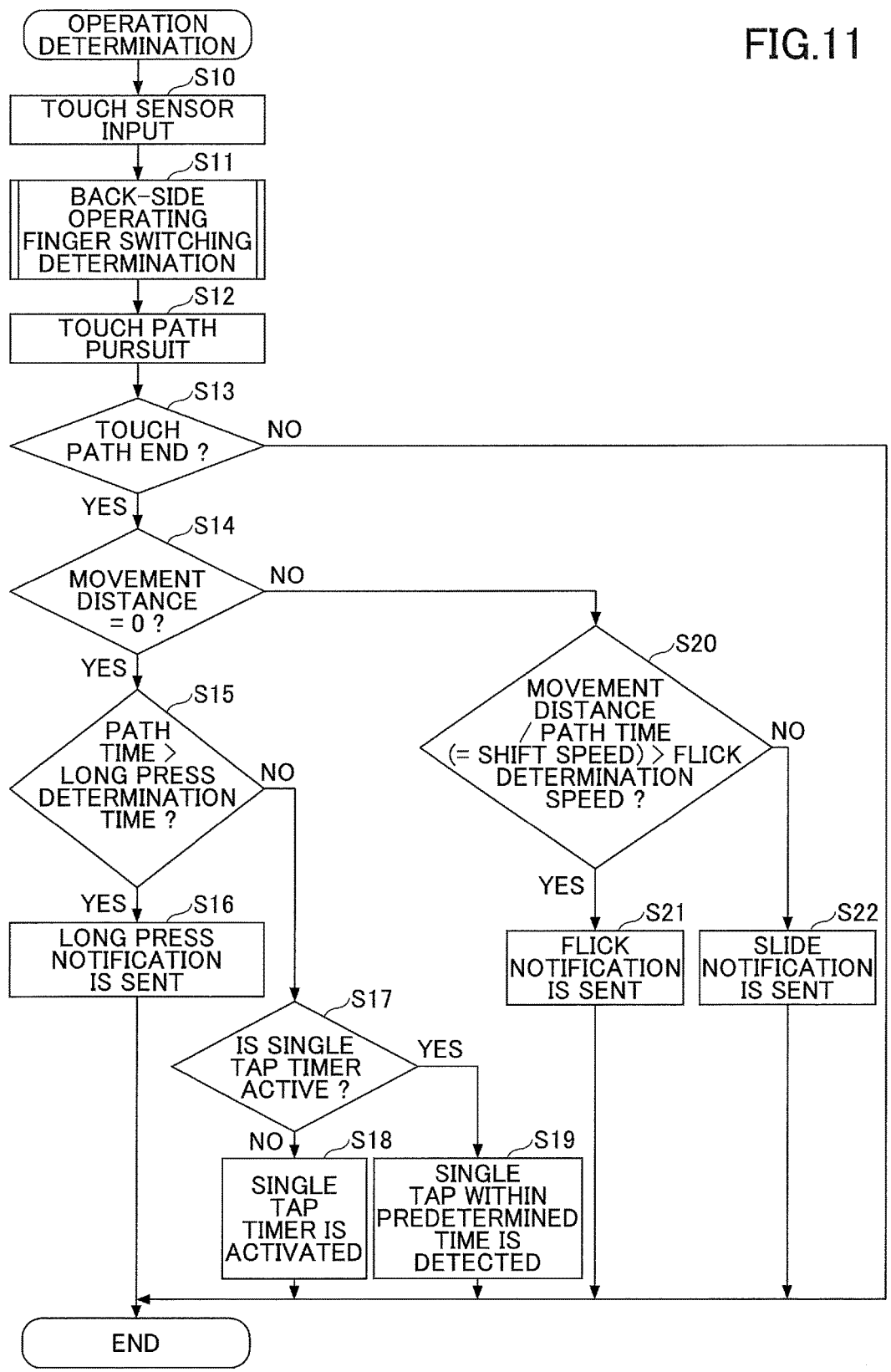
FIG. 11 is a flowchart for explaining an operation determination process.

FIG. 11 is a flowchart for explaining an operation determination process. As illustrated in FIG. 11, the operation determination unit 130 first detects an input to the right operation panel 120*a* and the left operation panel 120*b* (which are collectively referred to as the operation panel 120) (step S10). Subsequently, the operation determination unit 130 performs a back-side operating finger switching determination process (step S11). This back-side operating finger switching determination process will be described later with reference to FIG. 12.

Subsequently, the operation determination unit 130 pursues the coordinates (X1, Y1) of a start point where the user first touches the operation panel 120, and the coordinates (X2, Y2) of an end point (step S12). Subsequently, the operation determination unit 130 determines whether the touch path is terminated (step S13). When the touch path is terminated (YES in step S13), the operation determination unit 130 proceeds to processing of step S14. On the other hand, when the touch path is not terminated (NO in step S13), the operation determination unit 130 terminates the operation determination process and performs again the processing of steps S10, S11, and S12 from the start.

Note that when two or more fingers come in contact with the operation panel 120, the operation determination unit 130 may perform the touch path pursuit for each of the fingers.

In step S14, the operation determination unit 130 determines whether the movement distance of the finger is equal to 0. When the movement distance of the finger is not equal to 0 (NO in step S14), the operation determination unit 130 proceeds to processing of step S20. On the other hand, when the movement distance of the finger is equal to 0 (YES in step S14), the operation determination unit 130 proceeds to processing of step S15.

In step S15, the operation determination unit 130 determines whether a path time is greater than a long press determination time. The path time indicates a period for which the user's finger comes in contact with the operation panel 120. The long press determination time is a threshold of the elapsed time for determining whether a long press operation is performed. When the path time is greater than the long press determination time (YES in step S15), the operation determination unit 130 sends to the processor 10 a notification indicating that a long press operation has been performed (step S16). When the path time is less than the long press determination time (NO in step S15), the operation determination unit 130 proceeds to processing of step S17.

In step S17, the operation determination unit 130 determines whether a single tap timer is active. When the single tap timer is not active (NO in step S17), the operation determination unit 130 activates the single tap timer (step S18). The single tap timer is a timer which is activated in a predetermined time after the operation panel 120 is tapped.

For example, the operation determination unit 130 may be configured to determine whether a double-tap operation is performed, by using the single tap timer to determine whether a tap operation is performed again after the operation panel 120 is tapped and before the predetermined time is elapsed (during the activation of the single tap timer).

When the single tap timer is active (YES in step S17), the operation determination unit 130 detects that a single tap operation is performed within the predetermined time (step S19).

Further, when the movement distance of the finger is not equal to 0 (NO in step S14), the operation determination unit 130 determines whether a shift speed which is obtained by dividing the movement distance by the path time is greater than a flick determination speed (step S20). The flick determination speed is a threshold of the shift speed for determining whether a flick operation is performed. When the shift speed is greater than the flick determination speed (YES in step S20), the operation determination unit 130 sends to the processor 10 a notification indicating that a flick operation has been performed (step S21). On the other hand, when the shift speed is less than the flick determination speed (NO in step S20), the operation determination unit 130 sends to the processor 10 a notification indicating that a slide operation has been performed (step S22).

Figure 12:
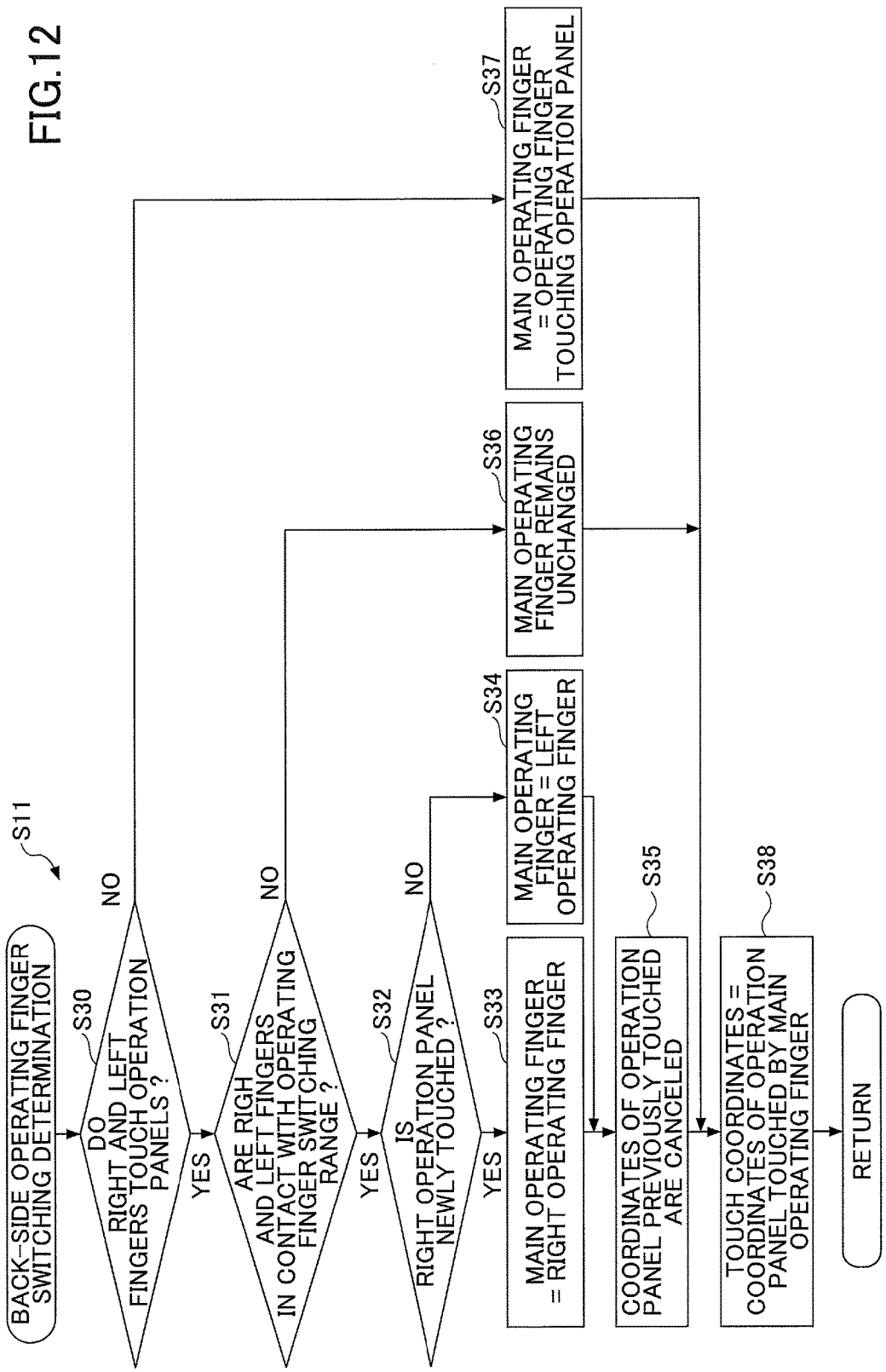
FIG. 12 is a flowchart for explaining a back-side operating finger switching determination process.

FIG. 12 is a flowchart for explaining the back-side operating finger switching determination process. As illustrated in FIG. 12, the operation determination unit 130 determines whether the user's right-hand and left-hand fingers touch the right operation panel 120*a* and the left operation panel 120*b* (step S30). When the right operation panel 120*a* and the left operation panel 120*b* are not touched (NO in step S30), the operation determination unit 130 determines that a main operating finger is the operating finger which touches one of the right operation panel 120*a* and the left operation panel 120*b* (step S37). Here, the main operating finger represents the operating finger which is currently operating the operation panel 120. Subsequently, the operation determination unit 130 proceeds to processing of step S38.

On the other hand, when both the right operation panel 120*a* and the left operation panel 120*b* are touched (YES in step S30), the operation determination unit 130 proceeds to processing of step S31.

In step S31, the operation determination unit 130 determines whether the right-hand and left-hand fingers come in contact with the operating finger switching ranges. When the right-hand and left-hand fingers come in contact with the operating finger switching ranges (YES in step S31), the operation determination unit 130 proceeds to processing of step S32. On the other hand, when the right-hand and left-hand fingers do not come in contact with the operating finger switching ranges (NO in step S31), the operation determination unit 130 determines that the main operating finger remains unchanged, and proceeds to processing of step S38.

In step S32, the operation determination unit 130 determines whether the newly touched operation panel is the right operation panel 120*a*. When the newly touched operation panel is the right operation panel 120*a* (YES in step S32), the operation determination unit 130 determines that the main operating finger is the right-hand operating finger (step S33). On the other hand, when the newly touched operation panel is the left operation panel 120*b* (NO in step S32), the operation determination unit 130 determines that the main operating finger is the left-hand operating finger (step S34). Subsequently, the operation determination unit 130 cancels the coordinates of the operation panel 120 previously touched by the main operating finger (step S35).

Subsequently, in step S38, the operation determination unit 130 determines that the touch coordinates are the coordinates of the operation panel 120 currently touched by the main operating finger. Subsequently, the operation determination unit 130 returns to the above-described processing of step S12 in the operation determination process illustrated in FIG. 11.

Figure 13A:
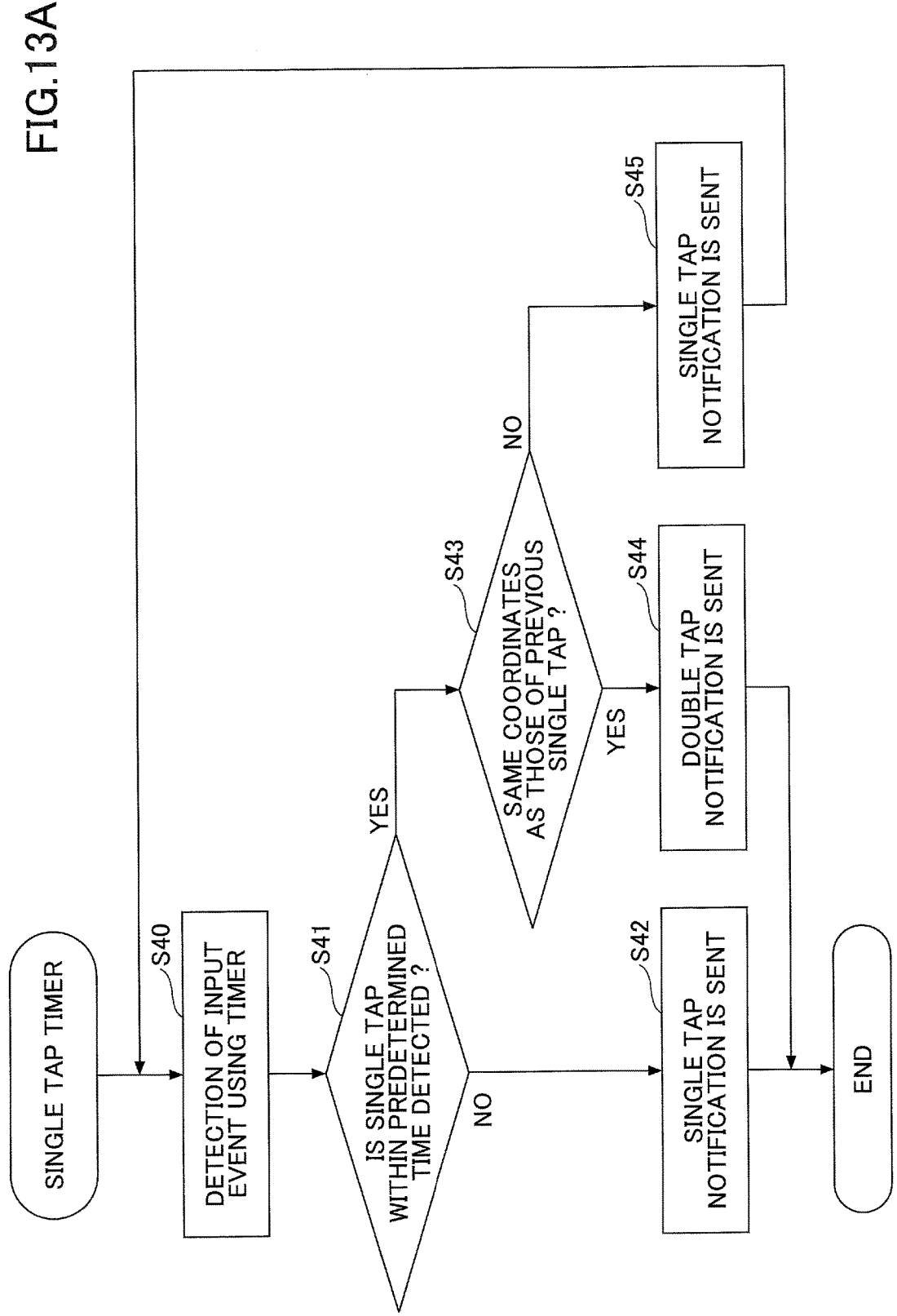
FIG. 13A is a flowchart for explaining an event determination process using a single tap timer.

FIG. 13A is a flowchart for explaining an event determination process using a single tap timer. The event determination process of FIG. 13A is started when a first tap operation on the operation panel 120 is performed and the processing of the step S18 in the operation determination process of FIG. 11 is performed. The operation determination unit 130 waits for the passage of the predetermined time by the single tap timer and the detection of a single tap operation at step S19 in the process of FIG. 11 (step S40). The operation determination unit 130 determines whether a single tap operation is detected within the predetermined time (step S41). When a single tap operation is detected within the predetermined time (YES in step S41), the operation determination unit 130 proceeds to the processing of step S43. On the other hand, when a single tap operation is not detected within the predetermined time (NO in step S41), the operation determination unit 130 sends to the processor 10 a notification indicating that a single tap operation is detected (step S42), and terminates the event determination process of FIG. 13A.

In step S43, the operation determination unit 130 determines whether the coordinates of the current single tap operation are the same as the coordinates of the previous single tap operation. When the coordinates of the current single tap operation are the same (YES in step S43), the operation determination unit 130 sends to the processor 10 a double-tap operation notification (step S44), and terminates the event determination process of FIG. 13A.

On the other hand, when the coordinates of the current single tap operation are not the same (NO in step S43), the operation determination unit 130 sends to the processor 10 a single tap operation notification for each of the previous single tap operation and the current single tap operation (step S45), and returns to the processing of step S40. Namely, the operation determination unit 130 determines that a single tap operation is performed twice at a different position of the operation panel 120.

FIG. 13B is a flowchart for explaining a relationship between the operation determination process and the event determination process using the single tap timer. The operation determination process of FIG. 11 and the event determination process using the single tap timer of FIG. 12 are performed concurrent with each other.

As illustrated in FIG. 13B, at step S17 of the operation determination process, the operation determination unit 130 determines whether the single tap timer is active by making reference to the status of the single tap timer. When the single tap timer is not active (NO in step S17), the operation determination unit 130 activates the single tap timer (step S18). Hence, the event determination process using the single tap timer is started at this time, and incrementing the single tap timer is started.

Subsequently, in the operation determination process, when the single tap timer is active and a single tap operation is performed again (YES in step S17), the operation determination unit 130 detects that the single tap operation is performed within the predetermined time (step S19).

In the event determination process using the single tap timer, when a single tap notification is received within the predetermined time as a result of the above step S19, the operation determination unit 130 determines that the single tap operation is detected within the predetermined time (YES in step S41) and proceeds to the processing of step S43.

In the event determination process using the single tap timer, when a single tap notification is not received within the predetermined time, the operation determination unit 130 determines that the single tap operation is not detected within the predetermined time (NO in step S41) and proceeds to the processing of step S42.

Figure 14:
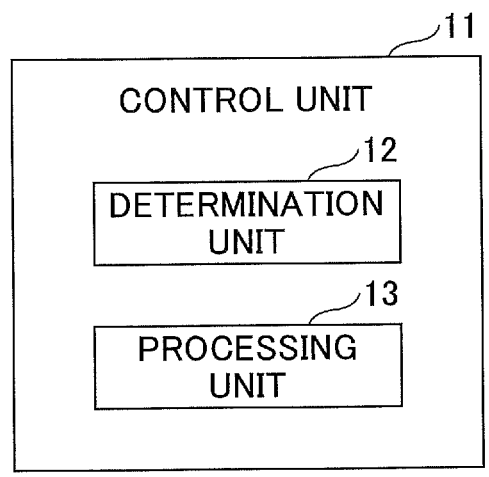
FIG. 14 is a diagram illustrating a functional configuration of a control unit implemented by a processor of the terminal device.

FIG. 14 illustrates a functional configuration of a control unit 11 implemented by the processor 10. As illustrated in FIG. 14, the control unit 11 includes a determination unit 12 and a processing unit 13. These units represent functions and units implemented by any of the components and devices of the terminal device 100 illustrated in FIG. 4, which are activated by instructions from the processor 10 based on the programs stored in the ROM 30 or the HDD 40.

The determination unit 12 is configured to determine the processing to the screen 110 based on the operation input to the operation panel 120. For example, the determination unit 12 is configured to identify the operation input to the operation panel 120, such as tap, double-tap, drag, or flick.

FIG. 15 illustrates examples of operations input to the operation panel 120. The determination unit 12 is configured to determine which of the operations in the table illustrated in FIG. 15 corresponds to the operation input to the operation panel 120.

As illustrated in FIG. 15, a single tap operation is an operation which taps the operation panel 120 once with an operating finger. A double tap operation is an operation which taps the operation panel 120 twice with an operating finger. For example, the determination unit 12 may be configured to determine that a double-tap operation is performed, when an additional tap operation is performed at the same position same on the operation panel 120 within a predetermined time after a first tap operation is performed.

A two-finger tap operation is an operation which taps the operation panel 120 with two adjacent operating fingers. A long press operation is an operation which places an operating finger in contact with the operation panel 120 over a predetermined time. A press and tap operation is an operation which performs a single tap operation with an operating finger while performing a long press operation with its adjacent operating finger. For example, the determination unit 12 may be configured to determine that a press and tap operation is performed, when, after a long press operation is detected, a single tap operation at a position on the operation panel 120 in the vicinity of a position of the long press operation is detected.

A flick operation is an operation which slides an operating finger on the operation panel 120 quickly. A drag operation is an operation which slides an operating finger on the operation panel 120. For example, the determination unit 12 may be configured to determine that a flick operation is performed, when the operating finger is slid on the operation panel 120 at a speed greater than a predetermined speed. The determination unit 12 may be configured to determine that a drag operation is performed, when the operating finger is slid on the operation panel 120 at a speed less than the predetermined speed.

A pinch-in operation is an operation which places two operating fingers in contact with the operation panel 120 to pinch an object between the fingers and reduce the space between the fingers. A pinch-out operation is an operation which places two operating fingers in contact with the operation panel 120 to pinch an object between the fingers and enlarges the space between the fingers.

A rotation operation is an operation which slides an operating finger on the screen 110 while touching an object on the operation panel 120 with an operating finger. When a right-hand operating finger is slid on the screen 110 upward or downward, the processing unit 13 causes the display layer 110a to perform a left-handed or right-handed rotation around the position of the operating finger on the operation panel 120. When a left-hand operating finger is slid on the screen 110 upward or downward, the processing unit 13 causes the display layer 110a to perform a right-handed or left-handed rotation around the position of the operating finger on the operation panel 120.

Referring back to FIG. 14, the processing unit 13 is configured to operate an object on the screen 110 based on the identification information of the operation from the determination unit 12. For example, when a single tap operation on an object is performed, the processing unit 13 causes the display layer 110a to perform an operation which clicks the object. When a drag operation is performed to surround an object, the processing unit 13 causes the display layer 110a to perform an operation which sets the object in a selection state.

Figure 16:
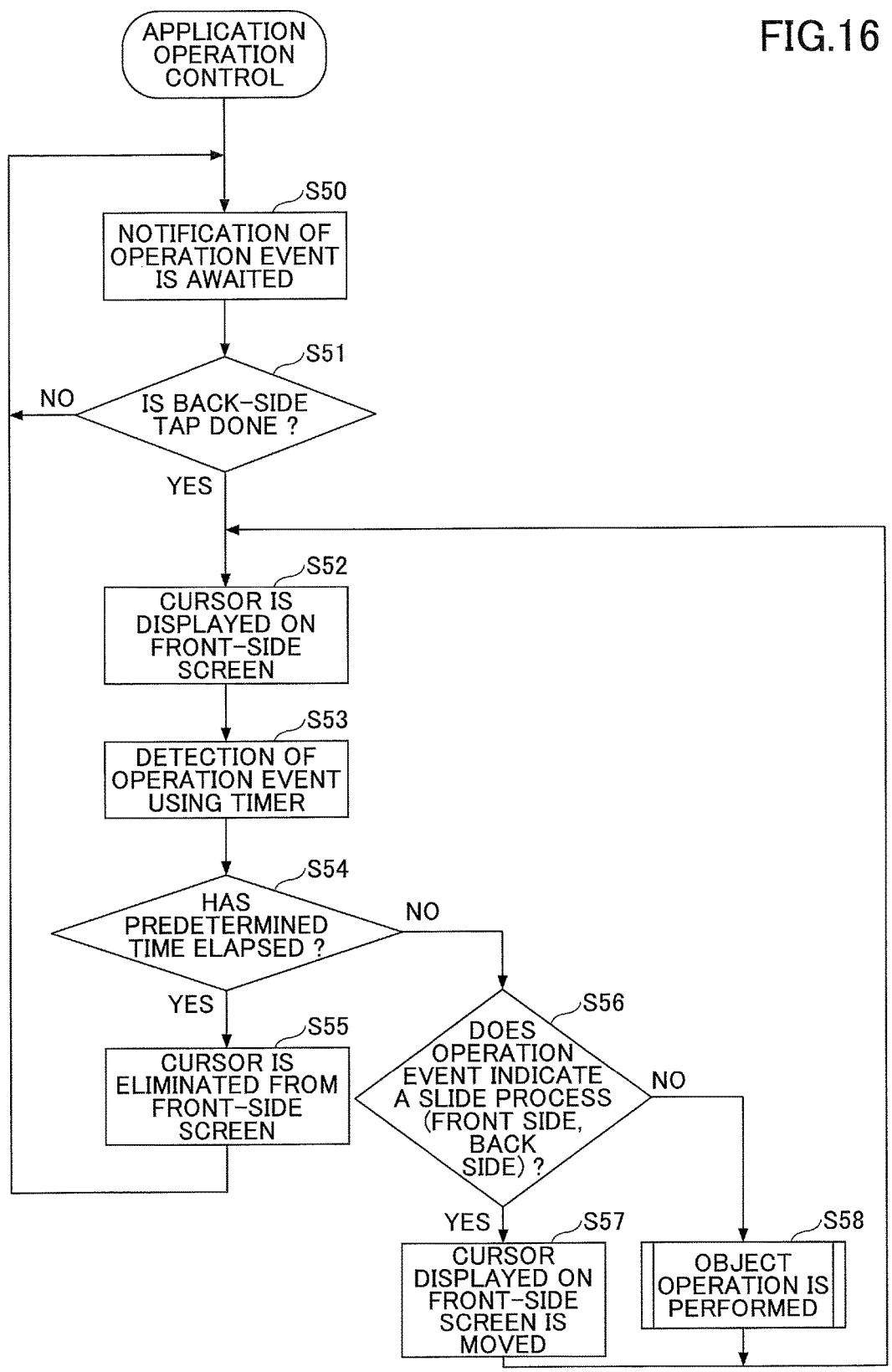
FIG. 16 is a flowchart for explaining an application operation control process.

FIG. 16 is a flowchart for explaining an application operation control process. As illustrated in FIG. 16, the determination unit 12 waits for reception of an operation event notification from the operation determination unit 130 (step S50). For example, an operation event notification is sent by the operation determination unit 130 at the steps S16, S21, and S22 in the process of FIG. 11 and at the steps S42, S44, and S45 in the process of FIG. 13A.

The determination unit 12 determines whether a back-side tap operation is performed based on the received operation event notification (step S51). When the back-side tap operation is performed (YES in step S51), the determination unit 12 proceeds to the processing of step S52. On the other hand, when an operation other than the back-side tap operation is performed (NO in step S51), the determination unit 12 returns to the step S50 above. Note that when an operation unrelated to the operation panel 120 is performed, the control unit 11 may perform another process according to an unillustrated flowchart.

When the back-side tap operation is detected by the determination unit 12, the processing unit 13 causes the display layer 110a to display the cursor on the screen 110 (step S52). Subsequently, the processing unit 13 measures the time for the operating finger coming in contact with the operation panel 120 and waits for reception of an operation event notification (step S53). When an operation event notification is not received during the passage of the predetermined time (YES in step S54), the determination unit 12 causes the processing unit 14 to eliminate the cursor displayed on the screen 110 (step S55). On the other hand, when an operation event notification is received during the passage of the predetermined time (NO in step S54), the determination unit 12 proceeds to the processing of step S56.

In step S56, the determination unit 12 determines whether the operation event is a slide process on the screen 110 or the operation panel 120. When the operation event is the slide process (YES in step S56), the determination unit 12 moves the cursor (pointer) on the screen 110 according to the movement of the operating finger (step S57). When the operation event is an operation other than the slide process on the operation panel 120 (NO in step S56), the determination unit 12 performs an object operation process (step S58). The object operation process at the step S58 will be described with reference to FIG. 17.

Figure 17:
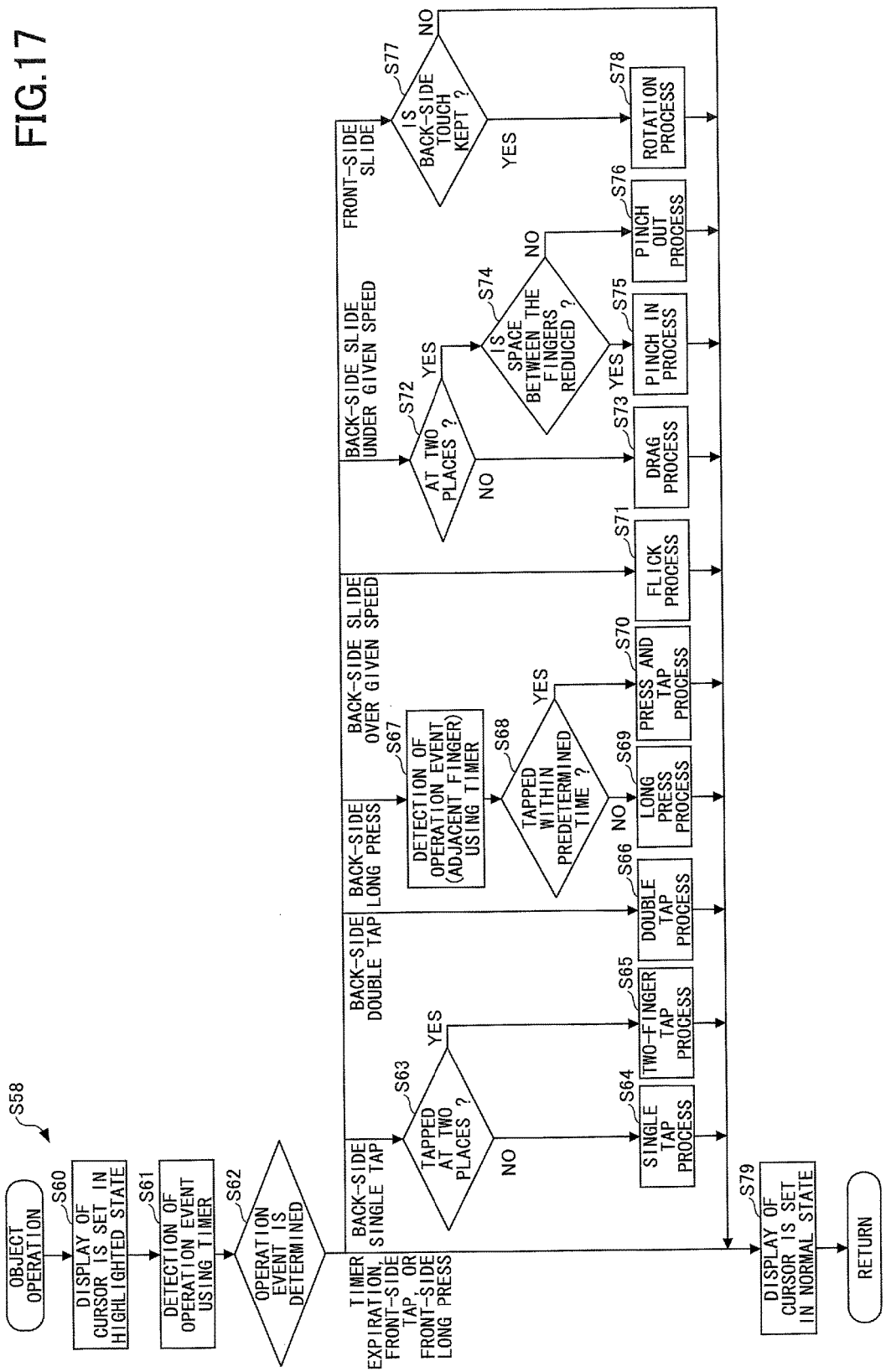
FIG. 17 is a flowchart for explaining an object operation process.

FIG. 17 is a flowchart for explaining the object operation process. The object operation process of FIG. 17 corresponds to the processing of the step S58 in the application operation control process of FIG. 16.

When the operation event is an operation other than the slide process at the step S56 in the process of FIG. 16, the determination unit 12 sets the display of the cursor in a highlighted state (step S60). Subsequently, the determination unit 12 waits for the input of an operation event within a predetermined time using a timer (step S61).

The determination unit 12 determines the operation event which is input within the predetermined time (step S62). When the timer expiration occurs or the tap or long press operation on the screen 110 is detected, the determination unit 12 sets the display of the cursor in a normal state (step S79) and returns the processing to the application operation control process of FIG. 16.

When a single tap operation on the operation panel 120 is input in step S62, the determination unit 12 determines whether the tap operation is detected at two adjoining places on the operation panel 120 (step S63). When the tap operation is detected at one place (NO in step S63), the determination unit 12 determines that the operation event is a single tap process (step S64). On the other hand, when the tap operation is detected at two adjoining places (YES in step S63), the determination unit 12 determines that the operation event is a two-finger tap process (step S65). The processing unit 13 performs a process according to the two-finger tap process on the screen 110.

When a second tap operation is input at the same position within the predetermined time after a first tap operation is input to the operation panel 120 in step S62, the determination unit 12 determines that the operation event is a double tap process (step S66). The processing unit 13 performs a process according to the double tap process on the screen 110.

When the operation which places the operating finger in contact with the operation panel 120 over the predetermined time is input in step S62, the determination unit 12 proceeds to the processing of step S67. In step S67, the determination unit 12 waits for a predetermined period and measures the time which the operating finger is in contact with the operation panel 120 (step S67). When no tap operation by the adjoining operating fingers is detected within the predetermined time (NO in step S68), the determination unit 12 determines that the operation event is a long press process (step S69). The processing unit 13 performs a process according to the long press process on the screen 110. On the other hand, when the tap operation by the adjoining operating fingers is detected within the predetermined time (YES in step S68), the determination unit 12 determines that the operation event is a press and tap process (step S70). The processing unit 13 performs a process according to the press and tap process on the screen 110.

When a slide operation on the operation panel 120 by the operating finger at a speed greater than a predetermined speed is detected in step S62, the determination unit 12 determines that the operation event is a flick process (step S71). The processing unit 13 performs a process according to the flick process on the screen 110.

When a slide operation on the operation panel 120 by the operating finger at a speed less than the predetermined speed is detected in step S62, the determination unit 12 determines whether the slide operation is detected at two places (step S72). When the slide operation only at one place is detected (NO in step S72), the determination unit 12 determines that the operation event is a drag process (step S73). On the other hand, when the slide operation is detected at two places (YES in step S72), the determination unit 12 determines whether the space between the fingers is reduced (step S74).

When the space between the fingers is reduced (YES in step S74), the determination unit 12 determines that the operation event is a pinch-in process (step S75). The processing unit 13 performs a process according to the pinch-in process on the screen 110. On the other hand, when the space between the fingers is enlarged (NO in step S74), the determination unit 12 determines that the operation event is a pinch-out process (step S76). The processing unit 13 performs a process according to the pinch-out process on the screen 110.

When the slide operation by the operating finger on the screen 110 is detected in step S62, the determination unit 12 determines whether the operation panel 120 is touched by the operating finger (step S77). When the operation panel 120 is touched (YES in step S77), the determination unit 12 determines that the operation event is a rotation process (step S78). For example, when the right-hand operating finger is slid on the screen 110 upward or downward, the processing unit 13 causes the display layer 110a to perform a left-handed or right-handed rotation around the position of the operating finger on the operation panel 120. When the left-hand operating finger is slid on the screen 110 upward or downward, the processing unit 13 causes the display layer 110a to perform a right-handed or left-handed rotation around the position of the operating finger on the operation panel 120.

In step S79, the processing unit 13 resets the display of the cursor from the highlighted state to the normal state.

As described above, according to the first embodiment, the right operation panel 120a and the left operation panel 120b are formed on the back side of the terminal device 100, and coordinate conversion is performed so that the finger operation range of each of the right operation panel 120a and the left operation panel 120b may be consistent with the size of the screen 110. Hence, the terminal device 100 according to the first embodiment is capable of providing increased screen operability. For example, when the user operates the terminal device with a comparatively large screen, the operation may be easily performed on the screen without moving his arm greatly. Even when operating the screen of the terminal device in narrow space, it is possible to reduce the possibility that the user's elbow hits a surrounding wall.

[Second Embodiment]

Figure 18:
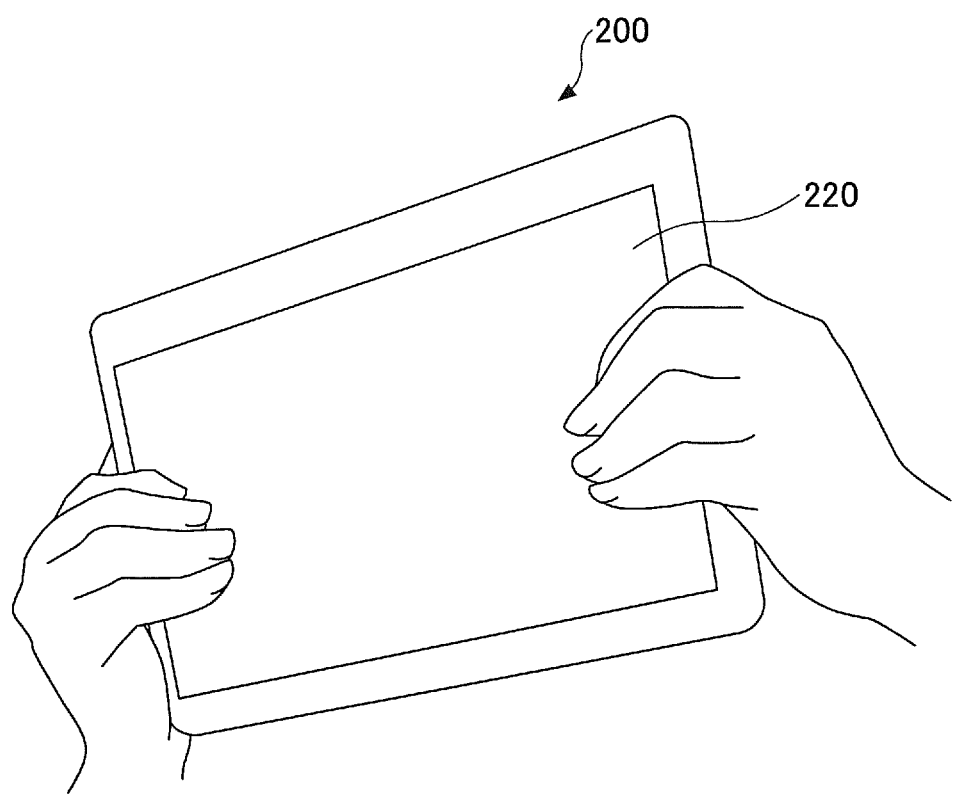
FIG. 18 is a diagram illustrating the appearance of a back side of a terminal device according to a second embodiment.

FIG. 18 illustrates the appearance of a back side of a terminal device 200 according to a second embodiment. As illustrated in FIG. 18, the terminal device 200 includes a single operation panel 220 on the back side of the terminal device 200. The operation panel 220 is provided to cover the overall surface of the back side of the terminal device 200. Hence, user's operating fingers certainly come in contact with the operation panel 220 irrespective of a size of a user's hand.

Figure 19:
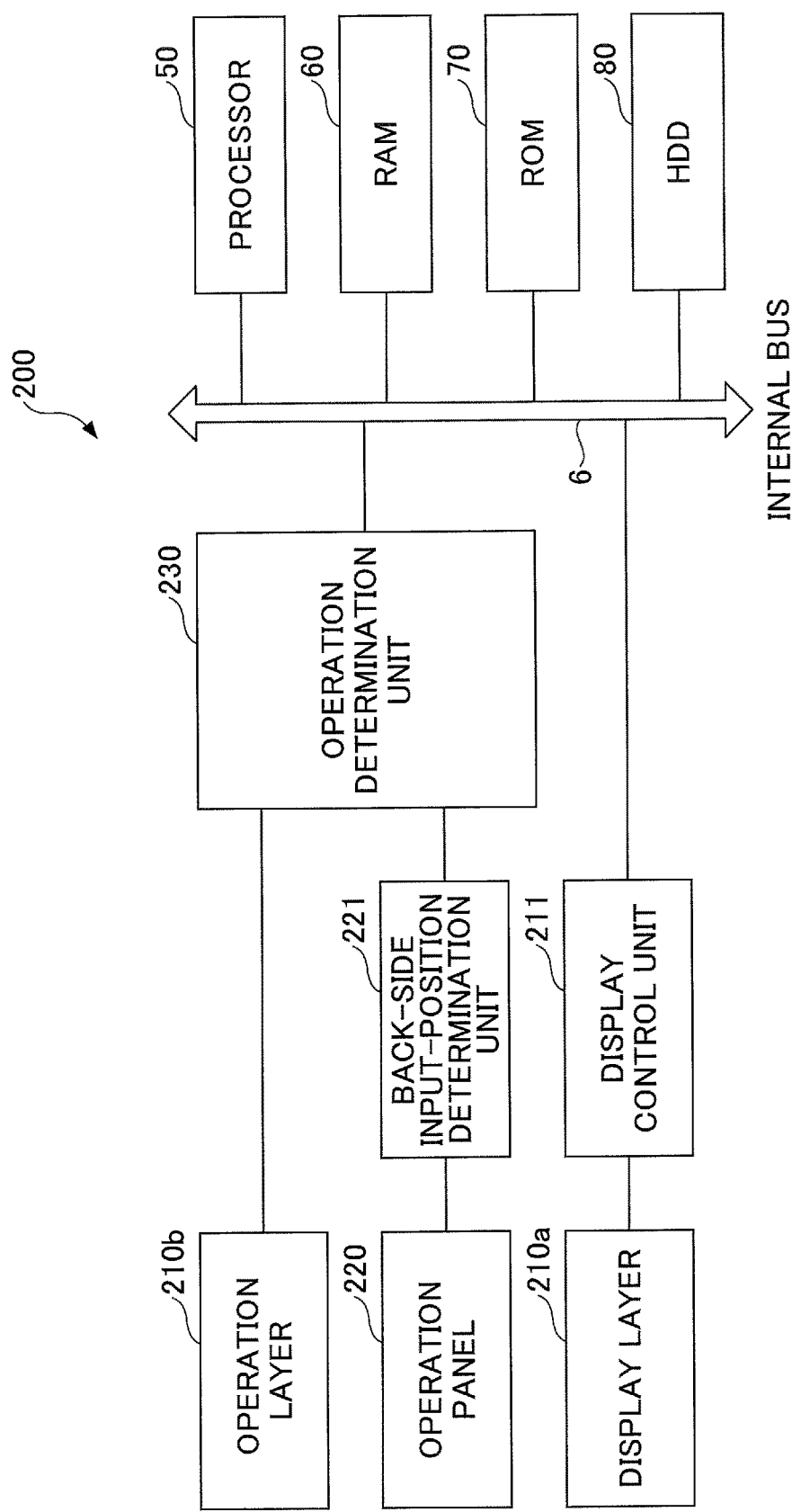
FIG. 19 is a block diagram illustrating a configuration of internal components of the terminal device according to the second embodiment.

FIG. 19 illustrates a configuration of internal components of the terminal device 200. As illustrated in FIG. 19, the terminal device 200 includes a processor 50, a RAM 60, a ROM 70, a HDD 80, a display layer 210a, an operation layer 210b, a display control unit 211, the operation panel 220, a back-side input position determination unit 221, and an operation determination unit 230. The processor 50, the RAM 60, the ROM 70, the HDD 80, the display control unit 211, and the operation determination unit 230 are interconnected by an internal bus 6.

The ROM 70 or the HDD 80 stores programs for controlling the terminal device 200. The display control unit 211, the back-side input position determination unit 221, and the operation determination unit 230 represent functions and units implemented by any of the components and devices of the terminal device 200 illustrated in FIG. 19, which are activated by instructions from the processor 50 based on the programs stored in the ROM 70 or the HDD 80.

Figure 20:
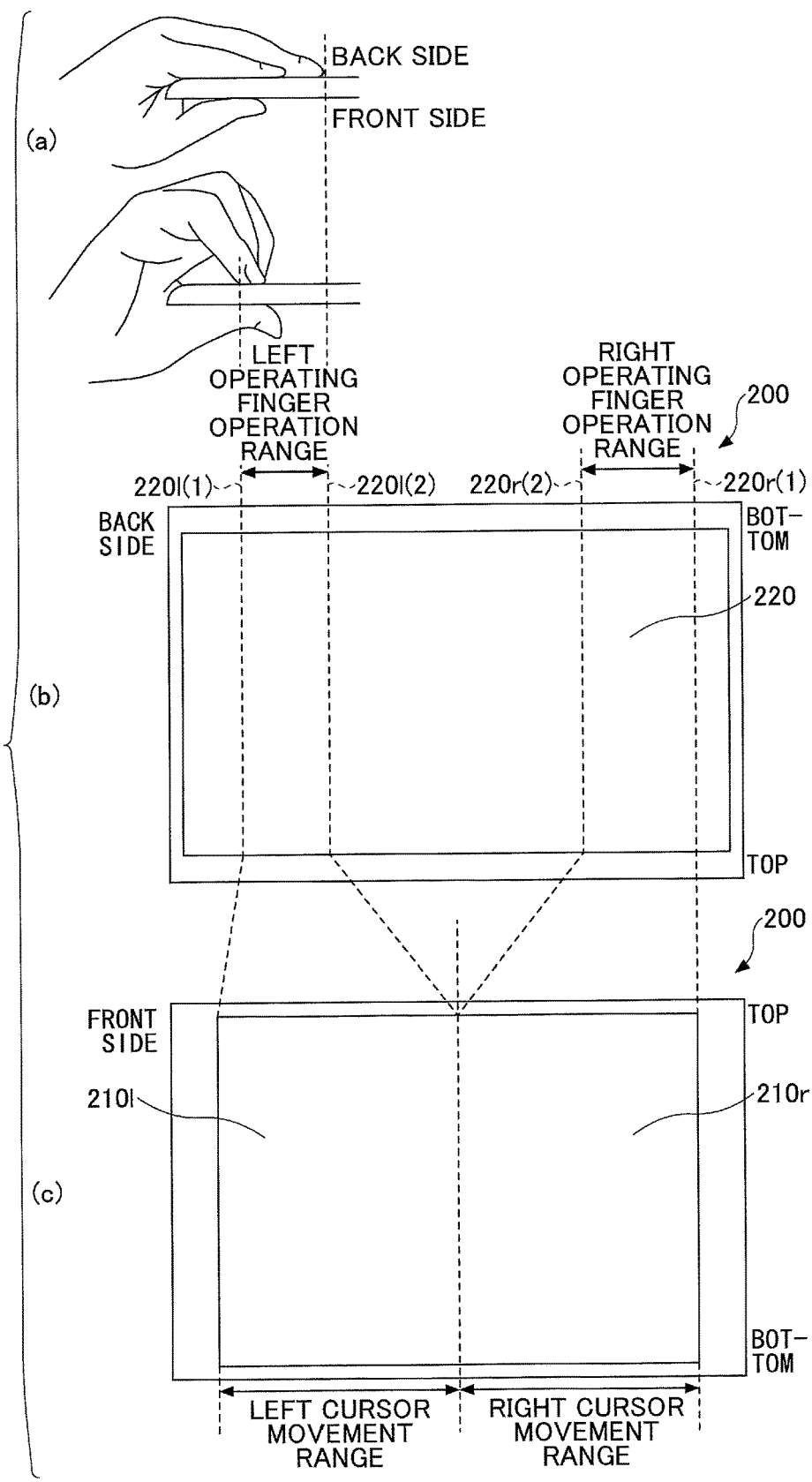
FIG. 20 is a diagram illustrating a positional relationship of a screen and an operation panel of the terminal device.

FIG. 20 illustrates a positional relationship of a screen 210 and the operation panel 220. Similar to the terminal device 100 illustrated in FIG. 1, the terminal device 200 includes the screen 210 on the front side of the terminal device 200. The screen 210 is divided into a right screen 210r as a right-side half of the screen 210 and a left screen 210l as a left-side half of the screen 210. The screen 210 includes the display layer 210a which displays information such as an image to a user, and the operation layer 210b which receives an operation input from the user to the screen 210.

An example of a left operating finger operation range is illustrated in FIG. 20 (a). Each of upper and lower parts of FIG. 20 (a) is a side view of the terminal device 200. An upper part of FIG. 20 (a) is equivalent to the back side of the terminal device 200, and a lower part of FIG. 20 (a) is equivalent to the front side of the terminal device 200. FIG. 20 (b) is a bottom view (the back side) of the terminal device 200, and FIG. 20 (c) is a top view (the front side) of the terminal device 200.

In the upper part of FIG. 20 (a), a user extends his left-hand finger to the utmost limit while gripping the terminal device 200. In the lower part of FIG. 20 (a), the user bends the left-hand finger to the nearest limit while gripping the terminal device 200. The left operating finger operation range is a range from a position (boundary 2201(2)) of the operation panel 220 contacted by the finger illustrated in the upper part of FIG. 20 (a) to a position (boundary 2201(1)) of the operation panel 220 contacted by the finger illustrated in the lower part of FIG. 20 (a). Note that a description of the right operating finger operation range is omitted.

The operation panel 220 disposed on the back side of the terminal device 200 is illustrated in FIG. 20 (b). For example, a calibration of the terminal device 200 may be performed when a user starts using the terminal device 200, so that the right operating finger operation range and the left operating finger operation range are determined. By performing the calibration, the size of a user's hand and the characteristics of user's operations may be reflected in the right operating finger operation range and the left operating finger operation range. As illustrated in FIG. 20 (b), there may be a case in which the right operating finger operation range differs in size from the left operating finger operation range.

Note that if the user moves the operating fingers greatly inside the operation panel 220 at the time of a calibration, the right operating finger operation range and the left operating finger operation range may overlap each other.

On the internal portions of the right operating finger operation range and the left operating finger operation range of the operation panel 220, determined by the calibration, contact of an operating finger with the operation panel 220 is detected. On the other hand, on the portions of the operation panel 220 outside the right operating finger operation range and outside the left operating finger operation range, contact of an operating finger is not detected.

The screen 210 is illustrated in FIG. 20 (c). A portion of the screen 210 which is operational for the user with the right operating finger operation range corresponds to the screen 210r, and a portion of the screen 210 which is operational for the user with the left operating finger operation range corresponds to the screen 210l.

Further, a width of the screen 210r in a lateral direction is called a right cursor movement range, and a width of the screen 210l in the lateral direction is called a left cursor movement range. For example, the terminal device 200 is configured so that when a user's operating finger slides on the operation panel 220 from the outer boundary 2201(1) to the inner boundary 2201(2) of the left operating finger operation range, the cursor is moved from a left end to a right end of the left cursor movement range (from a left end to a right end of the screen 210l).

Figure 21:
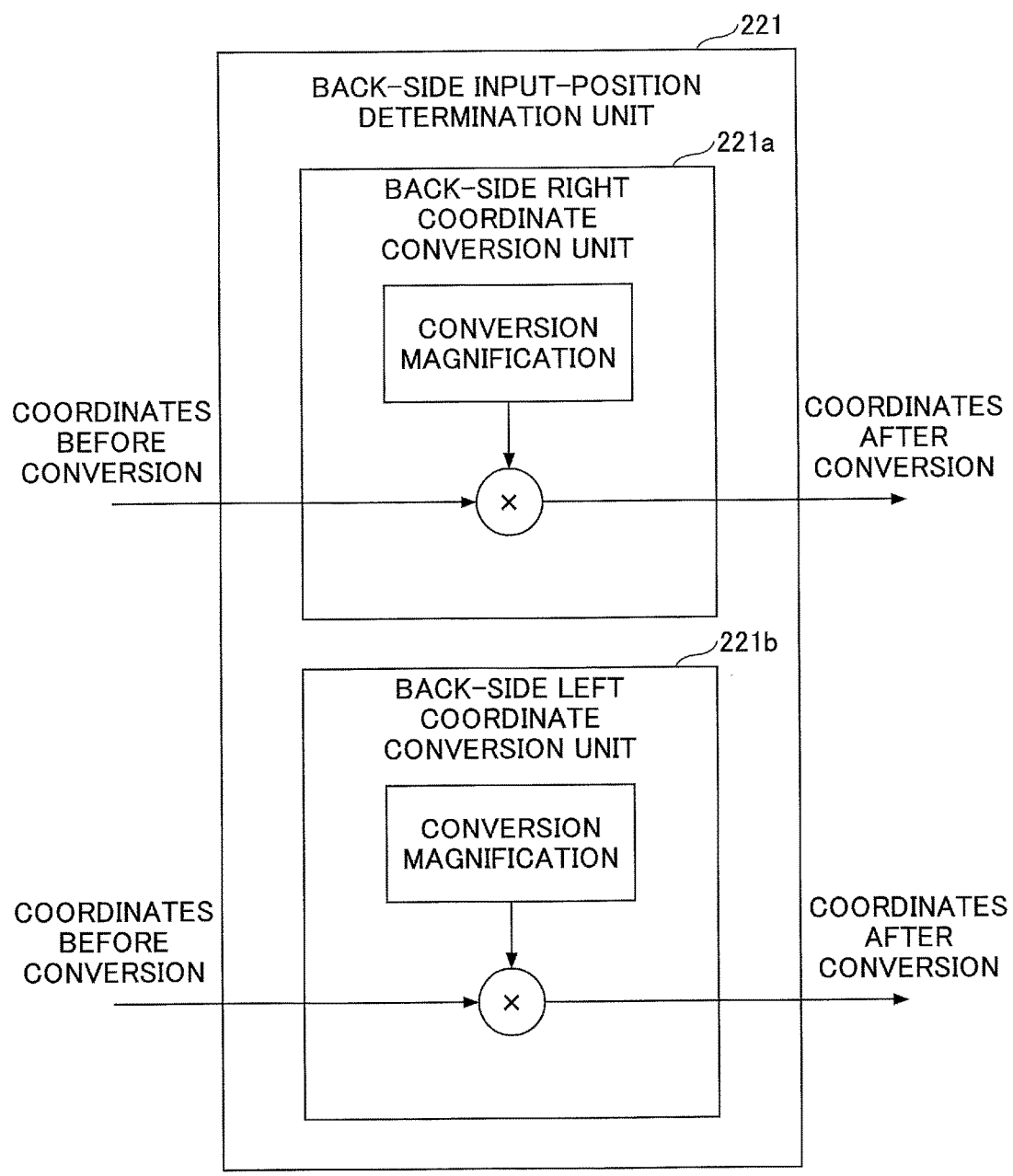
FIG. 21 is a diagram illustrating a configuration of internal components of a back-side input position determination unit.

FIG. 21 illustrates a configuration of internal components of the back-side input position determination unit 221. As illustrated in FIG. 21, the back-side input position determination unit 221 includes a back-side right coordinate conversion unit 221a and a back-side left coordinate conversion unit 221b.

The back-side right coordinate conversion unit 221a is configured to compute a conversion magnification by the following formula (II):

conversion magnification=(right cursor movement range)/{(right operating finger operation range) (=(right operating finger extension limit coordinate)−(right operating finger bending limit coordinate)}.

When the position of the finger in contact with the operation panel 220 moves, the back-side right coordinate conversion unit 221a is configured to multiply each of a movement distance of X coordinate of the point on the operation panel 220 and a movement distance of Y coordinate of the point by the conversion magnification to compute coordinates of a position of the cursor on the screen 210r after the movement.

Note that the back-side left coordinate conversion unit 221b is configured to compute a conversion magnification in the same manner as the back-side right coordinate conversion unit 221a.

Figure 22:
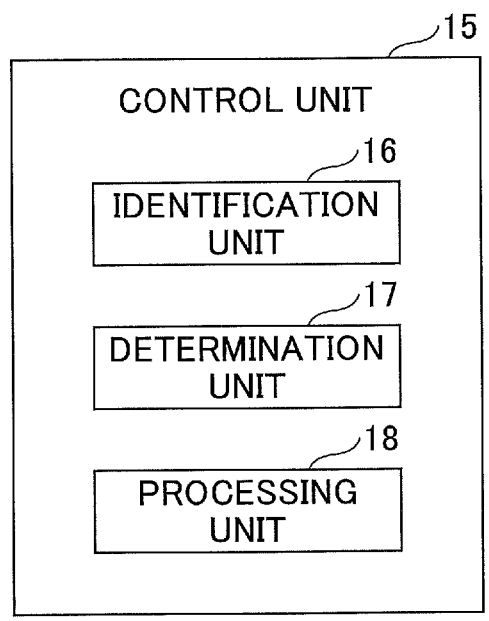
FIG. 22 is a diagram illustrating a functional configuration of a control unit implemented by a processor of the terminal device.

FIG. 22 illustrates a functional configuration of a control unit 15 implemented by the processor 50. As illustrated in FIG. 22, the control unit 15 includes an identification unit 16, a determination unit 17, and a processing unit 18. These units represent functions and units implemented by any of the components and devices of the terminal device 200 illustrated in FIG. 19, which are activated by instructions from the processor 50 based on the programs stored in the ROM 60 or the HDD 80.

The identification unit 16 is configured to perform a calibration of the terminal device 200, when a user starts using the terminal device 200, and to identify the left operating finger operation range and the right operating finger operation range. For example, the identification unit 16 prompts, on the screen 210, the user to extend his right-hand finger to the utmost limit on the operation panel 220, and stores a straight line including the coordinates of the right operating finger extension limit where the right-hand finger when extended to the utmost limit contacts the operation panel 220 into the RAM 60 as a boundary 220r(2). Moreover, the identification unit 16 prompts, on the screen 210, the user to bend the right-hand finger to the nearest limit on the operation panel 220, and stores a straight line including the coordinates of the right operating finger bending limit where the right-hand finger when bent to the nearest limit contacts the operation panel 220 into the RAM 60 as a boundary 220r(1). The portion which is formed of the boundary 220r(1) and the boundary 220r(2) is equivalent to the right operating finger operation range. In this way, the identification unit 16 is configured to identify the right operating finger operation range. Similarly, the identification unit 16 is configured to identify the left operating finger operation range.

Note that the identification unit 16 may be configured to perform a calibration arbitrarily according to a user's request, in a case where the user who operates the terminal device 200 is changed to a different user.

The determination unit 17 is configured to determine the process on the screen 210 based on the operation input to the operation panel 220.

The processing unit 18 is configured to operate the object on the screen 210 based on the result of the determination from the determination unit 17.

As described above, according to the second embodiment, the calibration of the terminal device is performed to identify the operating finger operation range for each of individual users. Hence, it is possible for the terminal device according to the second embodiment to provide increased screen operability as in the first embodiment and further provide a user with an appropriate operating environment according to the size of a user's hand and the characteristics of user's operations.

[Third Embodiment]

A configuration of internal components of a terminal device 200 according to a third embodiment is the same as that of the terminal device 200 according to the second embodiment illustrated in FIG. 19, and a description of the configuration of the internal components of the terminal device 200 according to the third embodiment will be omitted. The terminal device 200 according to the third embodiment is configured to extend in response to a user's request a range of the screen 210, which is operational with one of the right operating finger operation range and the left operating finger operation range on the operation panel 220, to the overall range of the screen 210. In this way, the user is able to easily operate the terminal device 200 with a single hand (either the right hand or the left hand).

FIG. 23 illustrates a positional relationship of the screen 210 and the operation panel 220.

In the upper part of FIG. 23 (a), a user extends his left-hand finger to the utmost limit while gripping the terminal device 200. In the lower part of FIG. 23 (a), the user bends the left-hand finger to the nearest limit while gripping the terminal device 200. The left operating finger operation range is a range from a position (boundary 2201(2)) of the operation panel 220 contacted by the finger illustrated in the upper part of FIG. 23 (a) to a position (boundary 2201(1)) of the operation panel 220 contacted by the finger illustrated in the lower part of FIG. 23 (a). Note that a description of the right operating finger operation range is omitted.

The operation panel 220 disposed on the back side of the terminal device 200 is illustrated in FIG. 23 (b). For example, a calibration of the terminal device 200 may be performed when a user starts using the terminal device 200, so that the left operating finger operation range is determined.

On an internal portion of the left operating finger operation range of the operation panel 220, contact of an operating finger with the operation panel 220 is detected. On the other hand, on the portions of the operation panel 220 outside the left operating finger operation range, contact of an operating finger with the operation panel 220 is not detected.

The screen 210 is illustrated in FIG. 23 (c). A portion of the screen 210 which is operational for the user with the left operating finger operation range is extended to the overall range of the screen 210. For example, the terminal device 200 is configured so that when a user's operating finger slides on the operation panel 220 from the outer boundary 2201(1) to the inner boundary 2201(2) of the left operating finger operation range, the cursor is moved from a left end to a right end of the cursor movement range (from a left end to a right end of the screen 210).

Next, the computation of the conversion magnification according to the third embodiment will be described. The back-side left coordinate conversion unit 221b is configured to compute a conversion magnification by the following formula (III):

> conversion magnification={cursor movement range (=width of the screen 210)}/{left operating finger operation range(=(left operating finger extension limit coordinate)−(left operating finger bending limit coordinate)}.

When the position of the finger in contact with the operation panel 220 moves, the back-side left coordinate conversion unit 221b is configured to multiply each of a movement distance of X coordinate of the point on the operation panel 220 and a movement distance of Y coordinate of the point by the conversion magnification to compute coordinates of a position of the cursor on the screen 210 after the movement. A movement distance of the cursor when the user's operating finger slides on the operation panel 220 in the left operating finger operation range is twice as great as that in the case of the second embodiment.

Note that, in a case where a range of the screen 210 which is operational with the right operating finger operation range on the operation panel 220 is extended to the overall range of the screen 210, the back-side right coordinate conversion unit 221a may be configured to compute the conversion magnification in the same manner as the back-side left coordinate conversion unit 221b.

As described above, according to the third embodiment, the range of the screen which is operational with one of the right operating finger operation range and the left operating finger operation range is extended to the overall range of the screen 210. Hence, it is possible for the terminal device according to the third embodiment to provide increased screen operability as in the first embodiment and further provide a user with the ability to operate the whole screen of the terminal device with either the right hand or the left hand.

[Fourth Embodiment]

The terminal device 200 according to a fourth embodiment may be configured to deactivate in response to a user's request operation of the operation panel 220, so that the terminal device 200 receives only an operation input from the user to the screen 210. Alternatively, the terminal device 200 may be configured to activate in response to a user's request one of plural modes, including a mode in which the terminal device 200 receives only an operation on the screen 210, a mode in which the terminal device 200 receives only an operation on the operation panel 220, and a mode in which the terminal device 200 receives both an operation on the operation panel 220 and an operation on the screen 210.

As described above, according to the fourth embodiment, the terminal device is capable of activating an appropriate one of the plural modes according to a user's request. Hence, it is possible for the terminal device according to the fourth embodiment to provide increased screen operability as in the first embodiment and further provide a user with the ability to suitably select one of the modes according to the current situation.

As described in the foregoing, it is possible for the terminal device according to the present disclosure to provide increased screen operability.

Although the terminal devices 100 and 200 according to the first through fourth embodiments have been described above, the terminal device according to the present disclosure is not limited to the above-described embodiments, and variations and modifications may be made without departing from the scope of the present disclosure.

In the above-described embodiments, the screen 110 and the screen 210 are an example of a screen. The operation determination unit 130 is an example of an input operation receiving function implemented by a processor. The right operation panel 120a, the left operation panel 120b, and the operation panel 220 are an example of an operation portion. The left operating finger operation range and the right operating finger operation range are an example of an operation range. The back-side right coordinate conversion unit 121a, the back-side left coordinate conversion unit 121b, the back-side right coordinate conversion unit 221a, and the back-side left coordinate conversion unit 221b are an example of a conversion function implemented by a processor.

What is claimed is:

1. A terminal device comprising:
a screen where information is displayed;
an operation range configured to fully or partially cover an operation portion disposed on a back side of the screen, an operation being input from a user to the operation range, the operation portion including a right operation portion at a right-hand part of the back side of the screen and a left operator portion at a left-hand part of the back side of the screen, and when the user grips the terminal device a right-hand finger and a left-hand finger of the user contact the right operation portion and the left operation portion, respectively; and
a processor configured to determine which of the right-hand finger and the left-hand finger of the user is currently operating as a main operating finger based on which of the right operation portion and the left operation portion is more recently touched, and to convert a signal obtained from the main operating finger of the user as operation input to the operation range into a cursor indicating coordinate information in an operational range of the screen;
wherein the processor is configured to switch the cursor operated by the main operating finger from the right-hand finger to the left-hand finger of the user in response to detecting a sliding movement on the right operator portion in a direction toward the left operator portion; and
wherein the operation range is smaller in size than the operational range of the screen.

2. The terminal device according to claim 1, wherein the operation range includes a first position where a finger of the user when extended to an utmost limit contacts the operation portion and a second position where the finger of the user when bent to a nearest limit contacts the operation portion.

3. The terminal device according to claim 1, wherein the operation range is identified as being a range between a first position where a finger of the user when expanded to an utmost limit contacts the operation portion, and a second position where the finger of the user when bent to a nearest limit contacts the operation portion, the processor is further configured to determine a right operation range from the operation portion during a calibration mode when the user contacts the operation portion with a right hand of the user, and to determine a left operation range from the operation portion during the calibration mode when the user contacts the operation portion with a left hand of the user, and the processor is configured to output the signal indicating the coordinate information in the operational range of the screen, the operational range of the screen being greater than a sum of the right operation range and the left operation range.

4. The terminal device according to claim 1, wherein the operation range is identified as being a range between a first position where a finger of the user when expanded to an utmost limit contacts the operation portion, and a second position where the finger of the user when bent to a nearest limit contacts the operation portion, the processor is further configured to identify the operation range from the operation portion when the user contacts the operation portion with one of right and left hands of the user, and the processor is configured to output the signal indicating the coordinate information in the operational range of the screen, the operational range of the screen being greater than the operation range identified with the one of the right and left hands of the user.

5. The terminal device according to claim 1, wherein the screen includes a display layer which displays information, and an operation layer which receives a second operation input from the user to the operation layer, and the processor is configured to receive, through one of the operation range and the operation layer of the screen, the operation input from the user to the operation range and the second operation input from the user to the operation layer.

6. The terminal device according to claim 5, wherein the processor is further configured to deactivate receiving one of the operation input to the operation range and the second operation input to the operation layer in response to a request of the user.

7. A method performed by a terminal device including a screen where information is displayed, comprising:

receiving an operation input from a user to an operation range, the operation range configured to fully or partially cover an operation portion disposed on a back side of the screen, the operation portion including a right operation portion at a right-hand part of the back side of the screen and a left operator portion at a left-hand part of the back side of the screen, and when the user grips the terminal device a right-hand finger and a left-hand finger of the user contact the right operation portion and the left operation portion, respectively;

determining which of the right-hand finger and the left-hand finger of the user is currently operating as a main operating finger based on which of the right operation portion and the left operation portion is more recently touched;

converting a signal obtained from the main operating finger of the user as the operation input to the operation range into a cursor indicating coordinate information in an operational range of the screen; and switching the cursor operated by the main operating finger from the right-hand finger to the left-hand finger of the user in response to detecting a sliding movement on the right operator portion in a direction toward the left operator portion.

8. A non-transitory computer-readable recording medium storing a program which, when executed by a processor of a terminal device including a screen where information is displayed, causes the processor to perform a process, the process comprising:

receiving an operation input from a user to an operation range, the operation range configured to fully or partially cover an operation portion disposed on a back side of the screen, the operation portion including a right operation portion at a right-hand part of the back side of the screen and a left operator portion at a left-hand part of the back side of the screen, and when the user grips the terminal device a right-hand finger and a left-hand finger of the user contact the right operation portion and the left operation portion, respectively;

determining which of the right-hand finger and the left-hand finger of the user is currently operating as a main operating finger based on which of the right operation portion and the left operation portion is more recently touched;

converting a signal obtained from the main operating finger of the user as the operation input to the operation range into a cursor indicating coordinate information in an operational range of the screen; and switching the cursor operated by the main operating finger from the right-hand finger to the left-hand finger of the user in response to detecting a sliding movement on the right operator portion in a direction toward the left operator portion.

9. The terminal device according to claim 1, wherein the processor is configured to detect the operation as one of a tap operation, a long press operation, a slide operation, and a flick operation.

* * * * *